(12) United States Patent
Abotabl et al.

(10) Patent No.: US 12,231,277 B1
(45) Date of Patent: Feb. 18, 2025

(54) TONE RESERVATION TECHNIQUES IN FULL-DUPLEX NETWORKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/451,001

(22) Filed: Aug. 16, 2023

(51) Int. Cl.
*H04L 27/26* (2006.01)
*H04L 5/14* (2006.01)
*H04W 72/0453* (2023.01)
*H04W 72/21* (2023.01)
*H04W 72/23* (2023.01)

(52) U.S. Cl.
CPC ..... *H04L 27/2618* (2013.01); *H04W 72/0453* (2013.01); *H04W 72/21* (2023.01); *H04W 72/23* (2023.01); *H04L 5/14* (2013.01)

(58) Field of Classification Search
CPC .. H04L 27/2618; H04L 5/14; H04W 72/0453; H04W 72/21; H04W 72/23
See application file for complete search history.

(56) References Cited

U.S. PATENT DOCUMENTS

| | | | | |
|---|---|---|---|---|
| 2021/0266210 | A1* | 8/2021 | Namgoong | ......... G06F 18/2148 |
| 2021/0344537 | A1* | 11/2021 | Sahraei | ................. H04L 5/0094 |

* cited by examiner

*Primary Examiner* — David S Huang
(74) *Attorney, Agent, or Firm* — Holland & Hart LLP/Qualcomm Incorporated

(57) ABSTRACT

Methods, systems, and devices for wireless communications are described. The described techniques provide for a network entity or a user equipment (UE), or both, to utilize a set of tones configured for tone reservation (TR) with full-duplex communications. The set of tones may be included in some boundary between, or that overlaps with, uplink and/or downlink resources configured for full-duplex communications. For example, a transmitting device (e.g., the network entity, the UE, or both) may use a boundary that overlaps with an uplink subband and/or a downlink subband for TR signaling. A transmitting device (e.g., the UE and/or network entity) may transmit one or more TR signals via resources associated with the boundary configured for TR, whereas data signals may be transmitted using resources configured for full-duplex communications that are different from the resources associated with the region configured for TR.

30 Claims, 17 Drawing Sheets

TR Allocation 320

PDSCH Allocation 325

TR Allocation 420

PDSCH Allocation 425

TONE RESERVATION TECHNIQUES IN FULL-DUPLEX NETWORKS

FIELD OF TECHNOLOGY

The following relates to wireless communications, including tone reservation (TR) techniques in full-duplex networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support tone reservation (TR) techniques in full-duplex networks. For example, the described techniques provide for a network entity and a user equipment (UE) to utilize a set of tones configured for TR with full-duplex communications. The set of tones may be included in some boundary between, or that overlaps with, uplink and/or downlink resources configured for full-duplex communications. As an example, for subband full-duplex (SBFD) communications, the network entity and the UE may use a boundary that overlaps with an uplink subband and/or a downlink subband for TR signaling, where the boundary includes tones with a relatively lower channel quality compared to tones that fall outside of the boundary. In such cases, a transmitting device (e.g., the UE and/or network entity) may transmit one or more TR signals (e.g., signals configured to reduce a peak-to-average power ratio (PAPR) of a data transmission) during a full-duplex slot via resources associated with the boundary configured for TR, whereas data messages (e.g., data transmitted via a physical downlink shared channel (PDSCH), data transmitted via a physical uplink shared channel (PUSCH)) may be transmitted during the full-duplex slot via resources configured for full-duplex communications and that are different from the resources associated with the region configured for TR. In some examples, the set of tones configured for TR may be located in some region that overlaps with uplink and downlink resources configured for the full-duplex communications (e.g., such as for in-band full-duplex (IBFD) communications). In any case, the network entity or the UE, or both, may accordingly use tones that fall within the boundary or the region configured for TR with relatively limited or no relative bandwidth loss, because such tones may be associated with relatively decreased channel quality (e.g., due self-interference and/or cross-link interference caused by simultaneous transmission and reception of the full-duplex communications).

A method for wireless communications by a wireless device is described. The method may include receiving a control message indicating a configuration of a first set of frequency resources for TR via a transceiver and during a full-duplex time interval, receiving, during the full-duplex time interval and via the transceiver, one or more data messages via a second set of frequency resources that at least partially overlaps with the first set of frequency resources, and receiving, during the full-duplex time interval and via the transceiver, one or more signals via the first set of frequency resources, where the one or more signals are configured to reduce a PAPR associated with the one or more data messages.

A wireless device for wireless communications is described. The wireless device may include one or more memories storing processor executable code, one or more transceivers, and one or more processors coupled with the one or more memories. The one or more processors may be individually or collectively operable to execute the code to receive a control message indicating a configuration of a first set of frequency resources for TR via the transceiver and during a full-duplex time interval, receive, during the full-duplex time interval and via the transceiver, one or more data messages via a second set of frequency resources that at least partially overlaps with the first set of frequency resources, and receive, via the transceiver and during the full-duplex time interval, one or more signals via the first set of frequency resources, where the one or more signals are configured to reduce a PAPR associated with the one or more data messages.

Another wireless device for wireless communications is described. The wireless device may include means for receiving a control message indicating a configuration of a first set of frequency resources for TR via a transceiver and during a full-duplex time interval, means for receiving, via the transceiver and during the full-duplex time interval, one or more data messages via a second set of frequency resources that at least partially overlaps with the first set of frequency resources, and means for receiving, via the transceiver and during the full-duplex time interval, one or more signals via the first set of frequency resources, where the one or more signals are configured to reduce a PAPR associated with the one or more data messages.

A non-transitory computer-readable medium storing code for wireless communications is described. The code may include instructions executable by one or more processors to receive a control message indicating a configuration of a first set of frequency resources for TR via a transceiver and during a full-duplex time interval, receive, via the transceiver and during the full-duplex time interval, one or more data messages via a second set of frequency resources that at least partially overlaps with the first set of frequency resources, and receive, via the transceiver and during the full-duplex time interval, one or more signals via the first set of frequency resources, where the one or more signals are configured to reduce a PAPR associated with the one or more data messages.

Some examples of the method, wireless devices, and non-transitory computer-readable medium described herein may further include operations, features, means, or instructions for determining that the first set of frequency resources at least partially overlaps with the second set of frequency resources in a frequency domain, where receiving the one or more data messages and the one or more signals may be based on the determination.

Some examples of the method, wireless devices, and non-transitory computer-readable medium described herein may further include operations, features, means, or instructions for receiving, via the transceiver, an indication that the first set of frequency resources partially overlaps with the second set of frequency resources in the frequency domain, where determining that the first set of frequency resources at least partially overlaps with the second set of frequency resources in the frequency domain may be based on the indication.

Some examples of the method, wireless devices, and non-transitory computer-readable medium described herein may further include operations, features, means, or instructions for receiving, via the transceiver, an indication that the first set of frequency resources fully overlaps with the second set of frequency resources in the frequency domain, where determining that the first set of frequency resources at least partially overlaps with the second set of frequency resources in the frequency domain may be based on the indication.

Some examples of the method, wireless devices, and non-transitory computer-readable medium described herein may further include operations, features, means, or instructions for receiving, via the transceiver, an indication of a second configuration for receiving the one or more data messages and the one or more signals via partially overlapping resources or via fully overlapping resources, or both, where determining that the first set of frequency resources at least partially overlaps with the second set of frequency resources in the frequency domain may be based on the second configuration.

Some examples of the method, wireless devices, and non-transitory computer-readable medium described herein may further include operations, features, means, or instructions for identifying a quantity of RBs including the first set of frequency resources based on the configuration, the quantity of RB being associated with a subcarrier spacing configuration, where the one or more signals may be received via the quantity of RBs.

Some examples of the method, wireless devices, and non-transitory computer-readable medium described herein may further include operations, features, means, or instructions for identifying one or more frequency bands including the first set of frequency resources based on the configuration, where the one or more signals may be received via the one or more frequency bands.

Some examples of the method, wireless devices, and non-transitory computer-readable medium described herein may further include operations, features, means, or instructions for receiving, via the transceiver, a second control message associated with the one or more data messages, the second control message indicating that the one or more signals to be received via the first set of frequency resources, where the one or more signals may be received in accordance with the second control message.

Some examples of the method, wireless devices, and non-transitory computer-readable medium described herein may further include operations, features, means, or instructions for determining that the one or more signals to be received via the first set of frequency resources based on a TR configuration associated with one or more half-duplex time intervals, where the one or more signals may be received based on the determination.

In some examples of the method, wireless devices, and non-transitory computer-readable medium described herein, the first set of frequency resources include resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

In some examples of the method, wireless devices, and non-transitory computer-readable medium described herein, the first set of frequency resources include resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval and the first frequency bandwidth at least partially overlaps with the second frequency bandwidth.

In some examples of the method, wireless devices, and non-transitory computer-readable medium described herein, the one or more data messages include uplink data messages.

In some examples of the method, wireless devices, and non-transitory computer-readable medium described herein, the one or more data messages include downlink data messages.

A method for wireless communications by a wireless device is described. The method may include receiving a control message indicating a configuration of a first set of frequency resources for TR via a transceiver and during a full-duplex time interval, transmitting, via the transceiver and during the full-duplex time interval, one or more data messages via a second set of frequency resources that at least partially overlap with the first set of frequency resources in a time domain, and transmitting, via the transceiver and during the full-duplex time interval, one or more signals via the first set of frequency resources, where the one or more signals are configured to reduce a PAPR associated with the one or more data messages.

A wireless device for wireless communications is described. The wireless device may include one or more memories storing processor executable code, a transceiver, and one or more processors coupled with the one or more memories. The one or more processors may be individually or collectively operable to execute the code to receive a control message indicating a configuration of a first set of frequency resources for TR via the transceiver and during a full-duplex time interval, transmit, via the transceiver and during the full-duplex time interval, one or more data messages via a second set of frequency resources that at least partially overlap with the first set of frequency resources in a time domain, and transmit, via the transceiver and during the full-duplex time interval, one or more signals via the first set of frequency resources, where the one or more signals are configured to reduce a PAPR associated with the one or more data messages.

Another wireless device for wireless communications is described. The wireless device may include means for receiving a control message indicating a configuration of a first set of frequency resources for TR via a transceiver and during a full-duplex time interval, means for transmitting, via the transceiver and during the full-duplex time interval, one or more data messages via a second set of frequency resources that at least partially overlap with the first set of frequency resources in a time domain, and means for transmitting, via the transceiver and during the full-duplex time interval, one or more signals via the first set of frequency resources, where the one or more signals are configured to reduce a PAPR associated with the one or more data messages.

A non-transitory computer-readable medium storing code for wireless communications is described. The code may include instructions executable by one or more processors to receive a control message indicating a configuration of a first set of frequency resources for TR via a transceiver and during a full-duplex time interval, transmit, via the transceiver and during the full-duplex time interval, one or more data messages via a second set of frequency resources that at least partially overlap with the first set of frequency resources in a time domain, and transmit, via the transceiver and during the full-duplex time interval, one or more signals via the first set of frequency resources, where the one or more signals are configured to reduce a PAPR associated with the one or more data messages.

Some examples of the method, wireless devices, and non-transitory computer-readable medium described herein may further include operations, features, means, or instructions for determining that the first set of frequency resources at least partially overlaps with the second set of frequency resources in a frequency domain, where transmitting the one or more data messages and the one or more signals may be based on the determination.

Some examples of the method, wireless devices, and non-transitory computer-readable medium described herein may further include operations, features, means, or instructions for receiving, via the transceiver, an indication that the first set of frequency resources partially overlaps with the second set of frequency resources in the frequency domain, where determining that the first set of frequency resources at least partially overlaps with the second set of frequency resources in the frequency domain may be based on the indication.

Some examples of the method, wireless devices, and non-transitory computer-readable medium described herein may further include operations, features, means, or instructions for receiving, via the transceiver, an indication that the first set of frequency resources fully overlaps with the second set of frequency resources in the frequency domain, where determining that the first set of frequency resources at least partially overlaps with the second set of frequency resources in the frequency domain may be based on the indication.

Some examples of the method, wireless devices, and non-transitory computer-readable medium described herein may further include operations, features, means, or instructions for receiving, via the transceiver, an indication of a second configuration for transmitting the one or more data messages and the one or more signals via partially overlapping resources or via fully overlapping resources, or both, where determining that the first set of frequency resources at least partially overlaps with the second set of frequency resources in the frequency domain may be based on the second configuration.

Some examples of the method, wireless devices, and non-transitory computer-readable medium described herein may further include operations, features, means, or instructions for identifying a quantity of resource blocks (RBs) including the first set of frequency resources based on the configuration, the quantity of RB being associated with a subcarrier spacing, where the one or more signals may be transmitted via the quantity of RBs.

Some examples of the method, wireless devices, and non-transitory computer-readable medium described herein may further include operations, features, means, or instructions for identifying one or more frequency bands including the first set of frequency resources based on the configuration, where the one or more signals may be transmitted via the one or more frequency bands.

Some examples of the method, wireless devices, and non-transitory computer-readable medium described herein may further include operations, features, means, or instructions for receiving, via the transceiver, a second control message associated with the one or more data messages, the second control message indicating that the one or more signals to be transmitted via the first set of frequency resources, where the one or more signals may be transmitted in accordance with the second control message.

Some examples of the method, wireless devices, and non-transitory computer-readable medium described herein may further include operations, features, means, or instructions for determining that the one or more signals to be transmitted via the first set of frequency resources based on a TR configuration associated with one or more half-duplex time intervals, where the one or more signals may be transmitted based on the determination.

In some examples of the method, wireless devices, and non-transitory computer-readable medium described herein, the first set of frequency resources include resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

In some examples of the method, wireless devices, and non-transitory computer-readable medium described herein, the first set of frequency resources include resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval and the first frequency bandwidth at least partially overlaps with the second frequency bandwidth.

In some examples of the method, wireless devices, and non-transitory computer-readable medium described herein, the one or more data messages include uplink data messages.

In some examples of the method, wireless devices, and non-transitory computer-readable medium described herein, the one or more data messages include downlink data messages.

A method for wireless communications by a wireless device is described. The method may include transmitting a control message indicating a configuration of a first set of frequency resources for TR during a full-duplex time interval, transmitting, during the full-duplex time interval, one or more data messages via a second set of frequency resources that at least partially overlaps with the first set of frequency resources, and transmitting, during the full-duplex time interval, one or more signals via the first set of frequency resources, where the one or more signals are configured to reduce a PAPR associated with the one or more data messages.

A wireless device for wireless communications is described. The wireless device may include one or more memories storing processor executable code, and one or more processors coupled with the one or more memories. The one or more processors may be individually or collectively operable to execute the code to transmit a control message indicating a configuration of a first set of frequency resources for TR during a full-duplex time interval, transmit, during the full-duplex time interval, one or more data messages via a second set of frequency resources that at least partially overlaps with the first set of frequency resources, and transmit, during the full-duplex time interval, one or more signals via the first set of frequency resources, where the one or more signals are configured to reduce a PAPR associated with the one or more data messages.

Another wireless device for wireless communications is described. The wireless device may include means for transmitting a control message indicating a configuration of a first set of frequency resources for TR during a full-duplex time interval, means for transmitting, during the full-duplex time interval, one or more data messages via a second set of frequency resources that at least partially overlaps with the first set of frequency resources, and means for transmitting, during the full-duplex time interval, one or more signals via the first set of frequency resources, where the one or more signals are configured to reduce a PAPR associated with the one or more data messages.

A non-transitory computer-readable medium storing code for wireless communications is described. The code may include instructions executable by one or more processors to transmit a control message indicating a configuration of a first set of frequency resources for TR during a full-duplex time interval, transmit, during the full-duplex time interval, one or more data messages via a second set of frequency resources that at least partially overlaps with the first set of frequency resources, and transmit, during the full-duplex time interval, one or more signals via the first set of frequency resources, where the one or more signals are configured to reduce a PAPR associated with the one or more data messages.

Some examples of the method, wireless devices, and non-transitory computer-readable medium described herein may further include operations, features, means, or instructions for determining that the first set of frequency resources at least partially overlaps with the second set of frequency resources in a frequency domain, where transmitting the one or more data messages and the one or more signals may be based on the determination.

Some examples of the method, wireless devices, and non-transitory computer-readable medium described herein may further include operations, features, means, or instructions for transmitting an indication that the first set of frequency resources partially overlaps with the second set of frequency resources in the frequency domain based on the determination.

Some examples of the method, wireless devices, and non-transitory computer-readable medium described herein may further include operations, features, means, or instructions for transmitting an indication that the first set of frequency resources fully overlaps with the second set of frequency resources in the frequency domain based on the determination.

Some examples of the method, wireless devices, and non-transitory computer-readable medium described herein may further include operations, features, means, or instructions for transmitting an indication of a second configuration for receiving the one or more data messages and the one or more signals via partially overlapping resources or via fully overlapping resources, or both, based on the determination.

Some examples of the method, wireless devices, and non-transitory computer-readable medium described herein may further include operations, features, means, or instructions for transmitting a second control message associated with the one or more data messages, the second control message indicating that the one or more signals to be received via the first set of frequency resources, where the one or more signals may be transmitted in accordance with the second control message.

Some examples of the method, wireless devices, and non-transitory computer-readable medium described herein may further include operations, features, means, or instructions for transmitting an indication of a TR configuration associated with one or more half-duplex time intervals, where the one or more signals may be transmitted based on the TR configuration associated with the one or more half-duplex time intervals.

In some examples of the method, wireless devices, and non-transitory computer-readable medium described herein, the first set of frequency resources may be defined by a quantity of RBs associated with a subcarrier spacing configuration, or one or more frequency bands, or any combination thereof.

A method for wireless communications by a wireless device is described. The method may include transmitting a control message indicating a configuration of a first set of frequency resources for TR during a full-duplex time interval, receiving, during the full-duplex time interval, one or more data messages via a second set of frequency resources that at least partially overlap with the first set of frequency resources in a time domain, and receiving, during the full-duplex time interval, one or more signals via the first set of frequency resources, where the one or more signals are configured to reduce a PAPR associated with the one or more data messages.

A wireless device for wireless communications is described. The wireless device may include one or more memories storing processor executable code, and one or more processors coupled with the one or more memories. The one or more processors may be individually or collectively operable to execute the code to transmit a control message indicating a configuration of a first set of frequency resources for TR during a full-duplex time interval, receive, during the full-duplex time interval, one or more data messages via a second set of frequency resources that at least partially overlap with the first set of frequency resources in a time domain, and receive, during the full-duplex time interval, one or more signals via the first set of frequency resources, where the one or more signals are configured to reduce a PAPR associated with the one or more data messages.

Another wireless device for wireless communications is described. The wireless device may include means for transmitting a control message indicating a configuration of a first set of frequency resources for TR during a full-duplex time interval, means for receiving, during the full-duplex time interval, one or more data messages via a second set of frequency resources that at least partially overlap with the first set of frequency resources in a time domain, and means for receiving, during the full-duplex time interval, one or more signals via the first set of frequency resources, where the one or more signals are configured to reduce a PAPR associated with the one or more data messages.

A non-transitory computer-readable medium storing code for wireless communications is described. The code may include instructions executable by a processor to transmit a control message indicating a configuration of a first set of frequency resources for TR during a full-duplex time interval, receive, during the full-duplex time interval, one or more data messages via a second set of frequency resources that at least partially overlap with the first set of frequency resources in a time domain, and receive, during the full-duplex time interval, one or more signals via the first set of frequency resources, where the one or more signals are configured to reduce a PAPR associated with the one or more data messages.

Some examples of the method, wireless devices, and non-transitory computer-readable medium described herein may further include operations, features, means, or instructions for determining that the first set of frequency resources at least partially overlaps with the second set of frequency resources in a frequency domain, where transmitting the one or more data messages and the one or more signals may be based on the determination.

Some examples of the method, wireless devices, and non-transitory computer-readable medium described herein may further include operations, features, means, or instructions for transmitting an indication that the first set of frequency resources partially overlaps with the second set of frequency resources in the frequency domain based on the determination.

Some examples of the method, wireless devices, and non-transitory computer-readable medium described herein may further include operations, features, means, or instructions for transmitting an indication that the first set of frequency resources fully overlaps with the second set of frequency resources in the frequency domain based on the determination.

Some examples of the method, wireless devices, and non-transitory computer-readable medium described herein may further include operations, features, means, or instructions for transmitting an indication of a second configuration for transmitting the one or more data messages and the one or more signals via partially overlapping resources or via fully overlapping resources, or both, based on the determination.

Some examples of the method, wireless devices, and non-transitory computer-readable medium described herein may further include operations, features, means, or instructions for transmitting a second control message associated with the one or more data messages, the second control message indicating that the one or more signals to be transmitted via the first set of frequency resources, where the one or more signals may be received in accordance with the second control message.

Some examples of the method, wireless devices, and non-transitory computer-readable medium described herein may further include operations, features, means, or instructions for transmitting an indication of a TR configuration associated with one or more half-duplex time intervals, where the one or more signals may be received based on the TR configuration associated with the one or more half-duplex time intervals.

In some examples of the method, wireless devices, and non-transitory computer-readable medium described herein, the first set of frequency resources may be defined by a quantity of RBs associated with a subcarrier spacing configuration, or one or more frequency bands, or any combination thereof.

DETAILED DESCRIPTION

Figure 1:
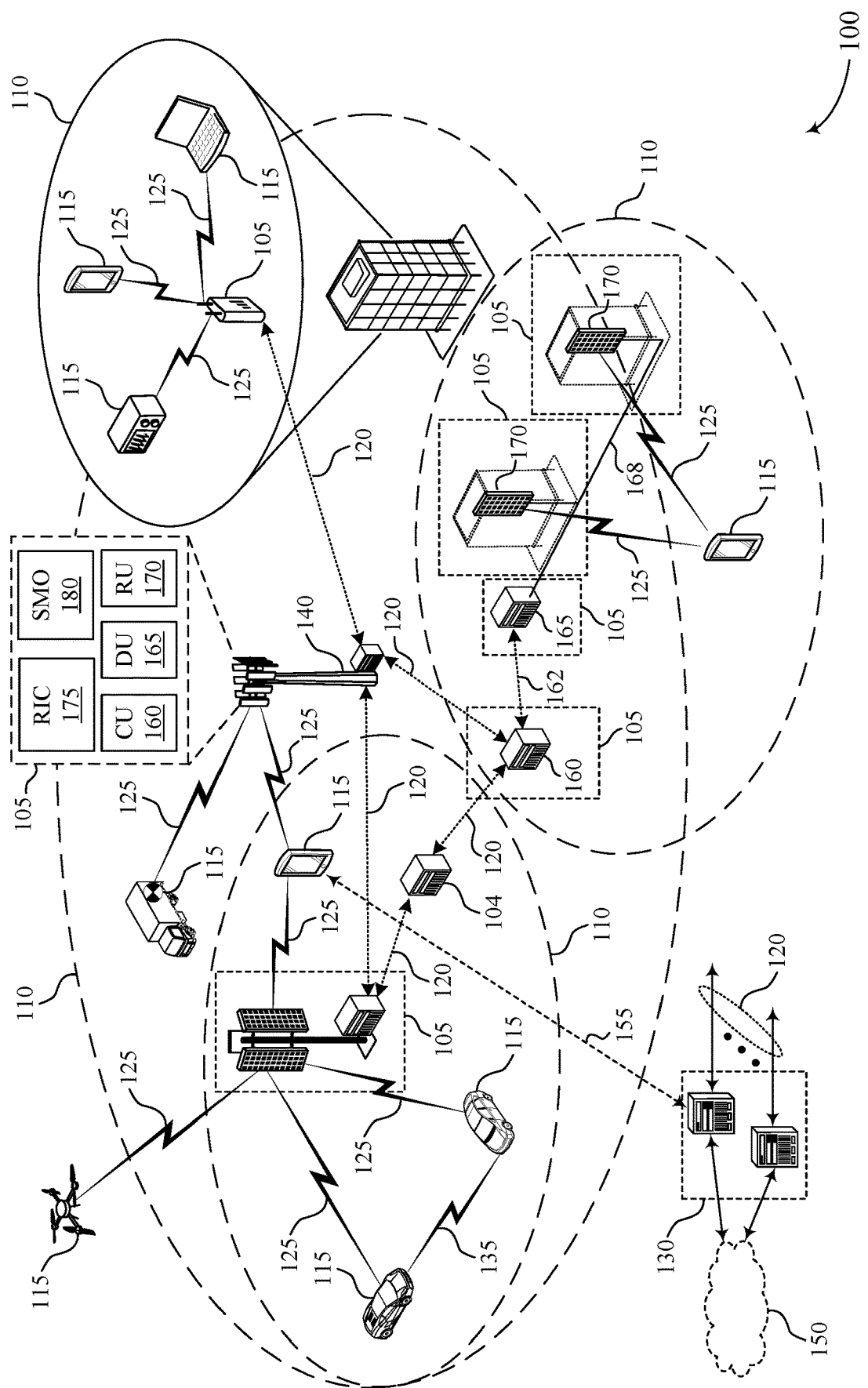
FIG. 1 shows an example of a wireless communications system that supports tone reservation (TR) techniques in full-duplex networks in accordance with one or more aspects of the present disclosure.

In some wireless communications systems, a wireless device (e.g., a network entity, a user equipment (UE)) may communicate with one or more other wireless devices by amplifying transmissions using one or more power amplifiers (PAs) to achieve a target transmission power. However, the power of the signaling may be non-uniform, resulting in transmissions that have a relatively large peak-to-average power ratio (PAPR), which may oversaturate the one or more PAs and result in decreased efficiency of the system. In some cases, such as for multi-carrier systems using orthogonal-frequency division multiplexing (OFDM), PAPR may be particularly high due to a linear combination of a quantity of modulation symbols (e.g., quadrature amplitude modulation (QAM) symbols) included in inverse fast Fourier transform (IFFT) operations by the transmitting device. In some cases, tone reservation (TR) techniques may be used to reduce the PAPR of data transmissions. For example, a wireless device may transmit one or more TR signals that are configured to reduce a PAPR of data transmissions. Such TR signaling may include peak-cancelation signals transmitted via a set of reserved tones and specifically configured to reduce the peak power of the data transmissions, and thus reduce the PAPR. That is, TR signals may not include usable data or specific information intended for a receiving device, but such TR signals may assist in the elimination or reduction of the PAPR associated with other, data-carrying signals, thereby improving communications quality for the receiving device. TR techniques, however, may in some cases be associated with a relative reduction in an effective size of an available bandwidth for the transmissions. That is, because a set of tones within the available bandwidth may be reserved for TR signals (e.g., peak-cancelation signals) rather than for data transmissions, an effective bandwidth for the data transmissions may be relatively decreased (e.g., as compared to transmissions without TR).

In some cases, a wireless device (e.g., a network entity, a UE) may communicate with other wireless devices using full-duplex communication techniques, such as subband full-duplex (SBFD) communications, in-band full-duplex (IBFD) communications, among other examples. For example, a UE may simultaneously receive downlink signaling from a network entity (or another device) and transmit uplink signaling to the network entity (or to one or more other devices) via one or more full-duplex (e.g., SBFD, IBFD) slots. A UE may operate using full-duplex communications within subbands of a component carrier (CC) (e.g., a single CC with defined frequency subbands for uplink and downlink communications) or across respective CCs (e.g., a first set of one or more CCs for uplink communications and a second set of one or more CCs for downlink communications). In some cases, some portion of resources used for full-duplex communications may be affected by self-interference (e.g., interference affecting a received signal caused by a simultaneous transmission by the same device) and/or cross-link interference (CLI) (e.g., interference affecting a received signal caused by other devices simultaneously communicating), which may result in the tones of some uplink and/or downlink resources (e.g., uplink subbands, downlink subbands) experiencing relatively decreased channel quality. That is, some tones (e.g., one or more frequency resources, such as one or more subcarriers, resource blocks (RBs), resource elements (REs), or the like) associated with full-duplex communications may be affected by full-duplex signaling, where such tones may have relatively poor channel quality, resulting in decreased full-duplex communications quality, reliability, and efficiency.

Accordingly, techniques described herein may enable a transmitting device to utilize tones affected by relatively low signal quality (e.g., caused by full-duplex communications) for TR techniques. That is, the network entity and the UE may utilize a set of tones for TR which have a relatively poor channel quality to mitigate PAPR associated with full-duplex transmissions. For example, for SBFD communications, the UE and network entity may use a configured boundary (e.g., a region of resources) that at least partially overlaps with an uplink subband or a downlink subband, or both, that are associated with full-duplex communications, where the boundary may contain tones associated with a relatively lower quality of communications as compared to tones which fall outside of the boundary. In the example of IBFD, a region that overlaps with uplink resources and downlink resources for IBFD communications may be configured for TR. In any case, the configured boundary may be used for the transmission of TR signaling to assist with PAPR reduction of one or more data messages (e.g., one or more data signals, one or more information-carrying signals, which may include control information, data, or other types of information for decoding and use by a receiving device). That is, during a full-duplex time interval, (e.g., a full-duplex slot) the network entity and/or the UE may transmit one or more data messages on a set of frequency resources, while also transmitting one or more other signals (e.g., TR signals) on another set of frequency resources (e.g., resources that at least partially overlap with the set of resources associated with the data messages) to reduce a PAPR associated with the one or more data messages. In some aspects, resources within the boundary or region associated with TR for full-duplex communications may be partially or fully used for TR signaling. In some examples, a UE may receive an indication to dynamically assume TR for tones within the configured boundary for full-duplex slots. In some aspects, the UE may use a different TR configuration (e.g., a TR configuration used for half-duplex slots) when the UE has not received an indication to assume TR for tones within the configured boundary.

The network entity and the UE may thus use tones that fall within the boundary or the region for TR that are associated with relatively poor channel quality (e.g., caused by full-duplex signaling), and any bandwidth loss from using such tones for TR techniques may be relatively inconsequential (e.g., because such tones may have otherwise been associated with decreased quality of a data transmission as a result of full-duplex communications). That is, the described techniques may enable the dynamic use of some tones associated with full-duplex communications that may be well-suited for TR signaling, and such techniques may enable reduced PAPR of full-duplex data transmissions without significantly affecting a communication bandwidth. As a result, the described techniques may enable increased communications efficiency and reliability.

Aspects of the disclosure are initially described in the context of wireless communications systems. Aspects of the disclosure are further illustrated by and described with reference to resource diagrams and process flow diagrams. Aspects of the disclosure are further illustrated by and described with reference to apparatus diagrams, system diagrams, and flowcharts that relate to TR techniques in full-duplex networks.

FIG. 1 shows an example of a wireless communications system 100 that supports TR techniques in full-duplex networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support TR techniques in full-duplex networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a subband, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (SCS) (e.g., $\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the wireless communications system 100 may support SBFD communications, in which a UE 115 or a network entity 105 may perform simultaneous communication of downlink signaling and communication of uplink signaling on a frequency subband basis (e.g., across a set of frequencies). For example, the UE 115 or the network entity 105 may partition a particular band (e.g., 100 MHz) into frequency subbands which the UE 115 and the network entity 105 may use exclusively for uplink or downlink communications. For example, the UE 115 and the network entity 105 may use the 40 MHz of a 100 MHz band for downlink communications, 20 MHz for uplink communications, and another 40 MHz again for downlink communications. That is, the uplink and downlink bands may have relatively similar frequencies, however, may be non-overlapping in frequency. SBFD communications may be suitable for macro cells with a large transmit power, and may be relatively simpler to enable than other full-duplex techniques. In addition, SBFD communications may improve latency and increase uplink coverage via frequency division duplexing (FDD) in time division duplexing (TDD) bands.

To further enhance flexibility of some operations, the wireless communications system 100 may support UEs 115 and network entities 105 which may both perform simultaneous transmission and reception of downlink and uplink communications via partially or fully overlapping frequency bands. For example, the wireless communications system 100 may support a UE 115 and a network entity 105 that operate using full-duplex communications via partially overlapping frequency bands, or a network entity 105 that operates using half-duplex communications (e.g., in a multi-transmission reception point (mTRP)) scenario) and a UE 115 and a network entity 105 that operate using SBFD communications.

In a TDD scenario, network entities 105 in the wireless communications system 100 may support SBFD operations (e.g., where a network entity 105 may communicate simultaneously on uplink and downlink subbands that are non-overlapping in frequency), while UEs 115 may support half-duplex communications. For example, the network entity 105 may use a particular subband for transmitting downlink communications to a first UE 115, and a particular subband for receiving simultaneous uplink communications from a second UE 115. As such, a UE 115 capable of half-duplex communications may be paired with any network entity 105 capable of SBFD operations in the wireless communications system 100.

In some examples, the network entity 105 and/or the UE 115 may use IBFD communications, in which the network entity 105 may transmit and receive communications with a UE 115 via a same time resource and a same frequency resource. That is, the downlink and uplink may share same IBFD time and frequency resources, which may partially or fully overlap. Alternatively, the network entity 105 may use subband FDD (e.g., flexible duplex) communications, in which the network entity 105 may transmit and receive communications with the UE 115 via a same time resource but via different frequency resources. That is, a frequency resource used for downlink communications may be separated from a frequency resource used for uplink communications (e.g., by a guard band).

Techniques described herein may enable some tones that would otherwise be associated with decreased data communications efficiency (e.g., due to relatively poor signal quality) be used instead for the transmission of TR signaling for reducing the PAPR of corresponding full-duplex data transmissions. That is, a network entity 105 and a UE 115 may utilize a set of tones within a full-duplex slot for TR that have low channel quality. The network entity 105, the UE 115, or both may transmit one or more peak-cancelation signals via the set of tones. For example, for SBFD communications or IBFD communications, the network entity 105 and the UE 115 may be configured with a boundary between an uplink subband and a downlink subband or a region containing an overlap between an uplink subband and a downlink subband, respectively, which may contain tones with a relatively lower quality of communications as compared to tones that fall outside of the boundary. The network entity 105 and the UE 115 may accordingly use tones that fall within the boundary or the region for TR signaling to reduce the PAPR of corresponding data messages. In some examples, the UE 115 may receive an indication to dynamically assume TR for tones within the configured boundary for full-duplex slots. In some aspects, the UE 115 may use a different TR configuration (e.g., a configuration used for half-duplex slots) when the UE 115 has not received an indication to assume TR for tones within the configured boundary.

Figure 2:
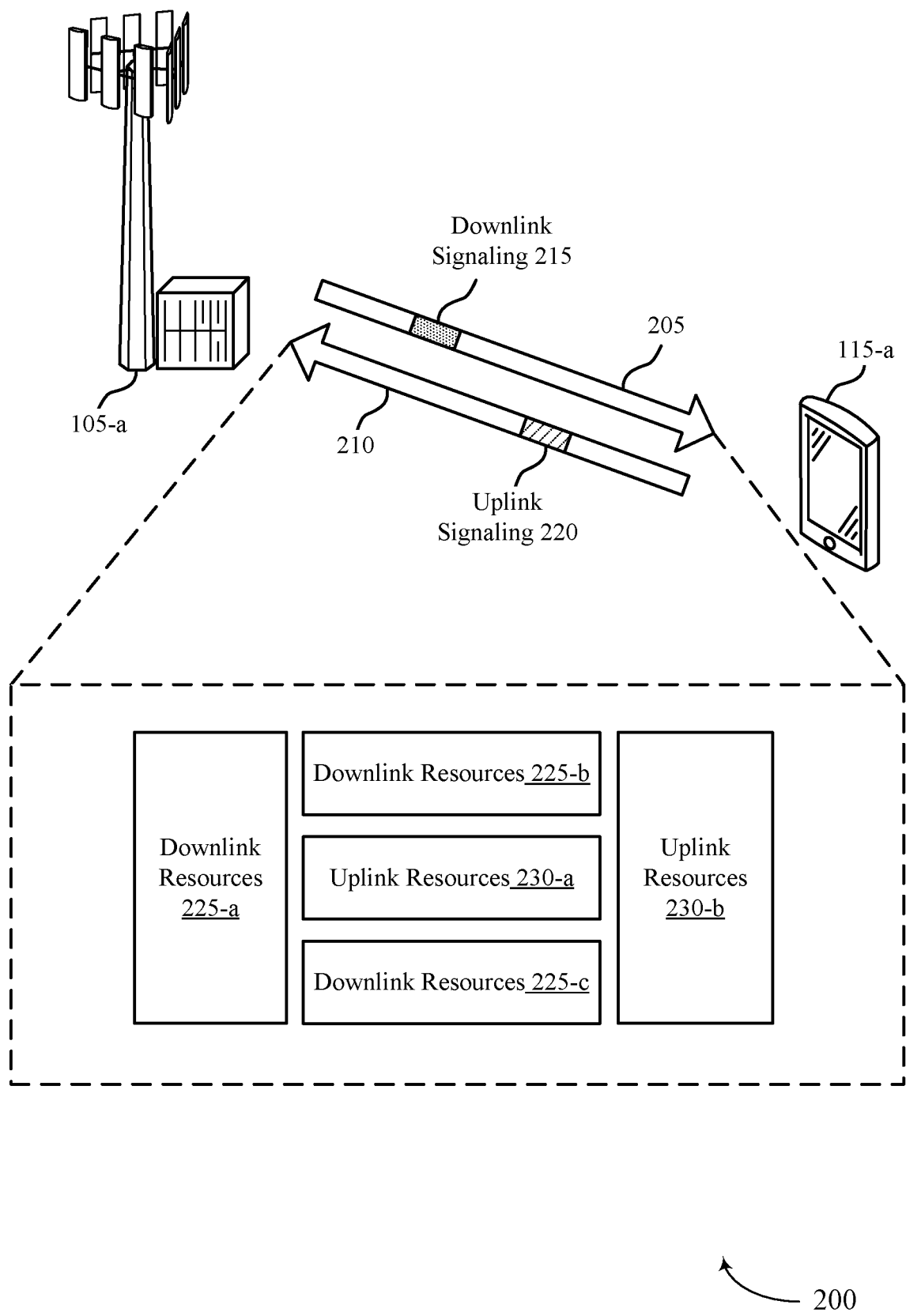
FIG. 2 shows an example of a wireless communications system that supports TR techniques in full-duplex networks in accordance with one or more aspects of the present disclosure.

FIG. 2 shows an example of a wireless communications system 200 that supports TR techniques in full-duplex networks in accordance with one or more aspects of the present disclosure. The wireless communications system 200 may implement or may be implemented by aspects of the wireless communications system 100. For example, the wireless communications system 200 may include a UE 115-a and a network entity 105-a, which may be examples of the corresponding devices as described with reference to FIG. 1.

In some wireless communication systems, such as the wireless communications system 200, a UE 115-a and a network entity 105-a may communicate signaling over one or more channels. For example, the network entity 105-a may transmit downlink signaling 215 to the UE 115-a via a downlink channel 205. The UE 115-a may transmit uplink signaling 220 to the network entity 105-a via an uplink channel 210. Such wireless communication systems may support half-duplex communications in which a device may either transmit or receive at a single time. That is, in slots reserved for half-duplex communications at the UE 115-a, the UE 115-a may either receive downlink signaling 215 (e.g., via downlink resources 225-a) or transmit uplink signaling 220 (e.g., via uplink resources 230-b).

Such wireless communications systems may, additionally, or alternatively, support full-duplex communications in which a device may transmit and receive signaling in shared time resources (e.g., and frequency resources). For example, the network entity 105-a and the UE 115-a may perform SBFD communications in which the network entity 105-a may receive uplink signaling via uplink resources 230 (e.g., uplink resources 230-a) and transmit downlink signaling via downlink resources 225 (e.g., downlink resources 225-b and downlink resources 225-c) that may overlap in time. That is, the UE 115-a and/or the network entity 105-a may simultaneously transmit and receive signaling via respective subbands. Additionally, or alternatively, the network entity 105-a and the UE 115-a may perform IBFD communications in which the network entity 105-a may concurrently receive uplink signaling via uplink resources 230 and transmit downlink signaling via downlink resources 225 that may overlap (e.g., partially or fully overlap) in both time and frequency.

In some cases, some portion of resources used for full-duplex communications may be affected by self-interference (e.g., interference affecting a received signal caused by a simultaneous transmission by the same device) and/or CLI (e.g., interference affecting a received signal caused by other devices simultaneously communicating), which may result in the tones of some uplink and/or downlink resources (e.g., uplink subbands, downlink subbands) experiencing relatively decreased channel quality. That is, some tones (e.g., one or more frequency resources, such as one or more subcarriers, RBs, REs, or the like) associated with full-duplex communications may be affected by full-duplex signaling, where such tones may have relatively poor channel quality, resulting in decreased full-duplex communications quality, reliability, and efficiency.

The network entity 105-a and the UE 115-a may communicate by amplifying signaling (e.g., downlink signaling 215 or uplink signaling 220) using one or more PAs to achieve a target average transmission power. However, the power of the amplified signaling may be non-uniform such that the transmissions have a large PAPR, which may oversaturate the one or more PAs and result in decreased efficiency of the system. To reduce the PAPR of the signaling, the network entity 105-a or the UE 115-a may use TR techniques by selecting a value of one or more tones to reduce a peak power of one or more data transmissions. That is, the network entity 105-a and the UE 115-a may transmit one or more peak-cancelation signals on a set of reserved tones to reduce the peak power of the data transmissions, and thus reduce the PAPR. TR techniques may, in some cases, decrease a size of an effective bandwidth for the data transmissions as a result of using the set of reserved tones for non-data transmissions.

Wireless communications system 200 may support techniques that enable a transmitting device to utilize tones having a relatively low signal quality (e.g., caused by full-duplex communications) for TR techniques. For example, the network entity 105-a and the UE 115-a may use a set of reserved tones for TR that have a relatively decreased channel quality than other tones in a set of reserved resources. For example, in full-duplex communications (e.g., SBFD communications, IBFD communications), the network entity 105-a and the UE 115-a may use tones that fall within a boundary between, or that at least partially overlaps with, downlink resources 225 and/or uplink resources 230 (e.g., or a region including a frequency overlap between downlink resources 225 and uplink resources 230). That is, in full-duplex communications, some portion or all of the boundary overlapping with at least one of downlink resources 225 or uplink resources 230 (or the boundary between some downlink resources 225 and some uplink resources 230) may suffer from self-interference and/or CLI as a result of a time overlap (e.g., and a frequency overlap) between signaling transmitted via resources reserved for uplink transmissions and signaling received via resources reserved for downlink transmissions. As a result of the self-interference and/or CLI, tones that fall within the boundary may experience a relatively lower channel quality than tones that do not fall within the boundary.

Accordingly, the network entity 105-a and the UE 115-a may use the tones that fall within the boundary for TR to enable PAPR reduction for full-duplex data transmissions (e.g., one or more data messages transmitted during a full-duplex slot, which may be transmitted via a physical downlink shared channel (PDSCH), via a physical downlink control channel (PDCCH), via another downlink channel, via a physical uplink shared channel (PUSCH), via a physical uplink control channel (PUCCH), via another uplink channel, via one or more other channels (such as one or more sidelink channels), or any combination thereof). That is, the network entity 105-a and the UE 115-a may transmit one or more peak-cancelation signals (which may be referred to as TR signals, PAPR-reducing signals, or the like) via the tones that fall within the boundary (e.g., and one or more data transmissions via resources reserved for downlink signaling 215 or uplink signaling 220). In some examples, the boundary may overlap in frequency (e.g., partially or fully) with the resources reserved for downlink signaling 215 and/or uplink signaling 220 (e.g., resources reserved for a PDSCH transmission, resources reserved for a PUSCH transmission, or the like).

In some examples, the boundary between the downlink resources 225 and the uplink resources 230 may not be associated with relatively high self-interference or CLI. For example, an uplink transmission may not be scheduled in the uplink resources 230-a of a full-duplex slot. As a result, a downlink transmission scheduled in the full-duplex slot may experience relatively reduced self-interference or CLI as compared to a downlink transmission scheduled in a same full-duplex slot as an uplink transmission. Similarly, in some examples, a downlink transmission may not be scheduled in a full-duplex slot, and an uplink transmission scheduled in the full-duplex slot may experience relatively less self-interference or CLI.

Accordingly, the network entity 105-a may indicate (e.g., dynamically indicate) for the UE 115-a to assume TR for tones that are included in the configured boundary. That is, the UE 115-a may assume that it may use TR in accordance with another criteria (e.g., a configuration associated with TR in half-duplex slots) unless the network entity 105-a indicates for the UE 115-a to assume TR (or not) for tones that are included in the configured boundary. The network entity 105-a may transmit the indication in a scheduling downlink control information (DCI) or in an activation DCI (e.g., for dynamic PDSCH scheduling or for semi-persistent scheduling (SPS), respectively).

Figure 3A:
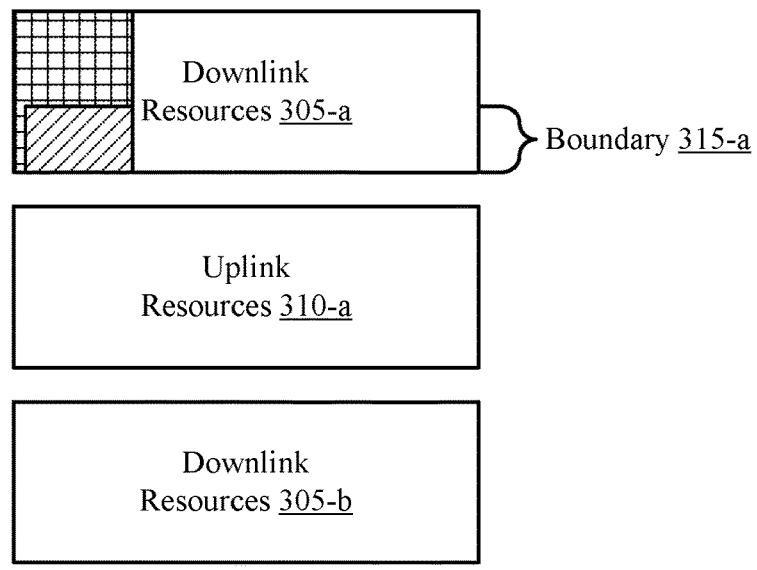
FIGS. 3A and 3B show examples of resource diagrams that support TR techniques in full-duplex networks in accordance with one or more aspects of the present disclosure.
Figure 3B:
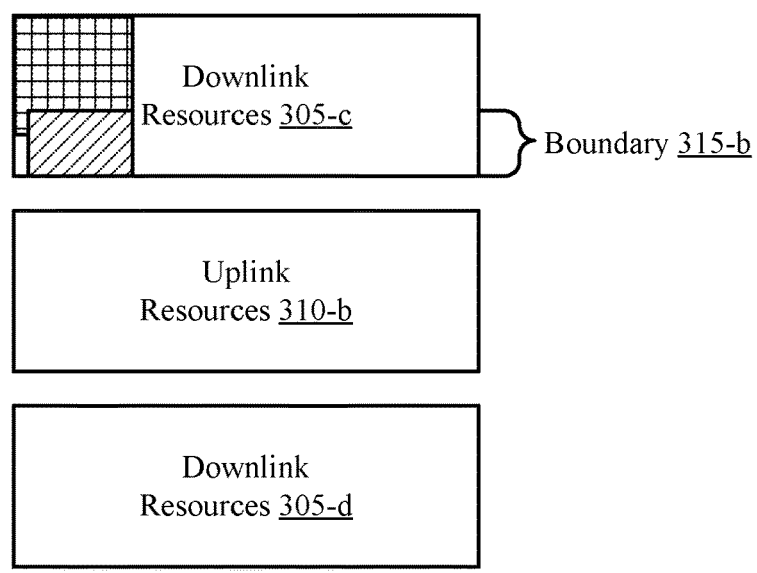
Figure 3B:
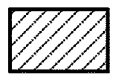
Figure 3B:
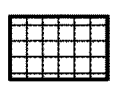

FIGS. 3A and 3B show examples of a resource diagram 300-a and a resource diagram 300-b, respectively, that support TR techniques in full-duplex networks in accordance with one or more aspects of the present disclosure. The resource diagram 300-a and the resource diagram 300-b may implement or may be implemented by aspects of the wireless communications system 100 or the wireless communications system 200. For example, the resource diagram 300-a and the resource diagram 300-b may include a UE 115 or a network entity 105, which may be examples of the corresponding devices as described with reference to FIG. 1.

As illustrated with reference to the resource diagram 300-a, in a SBFD slot, a UE 115 or a network entity 105 may utilize downlink resources 305 (e.g., downlink resources 305-a and downlink resources 305-c) and uplink resources 310 (e.g., uplink resources 310-a), which may overlap in time with the downlink resources 305. In some examples, the network entity 105 may use a PDSCH allocation 325 within the downlink resources 305-a (e.g., or within the downlink resources 305-b) to transmit a PDSCH to the UE 115.

In some implementations, the network entity 105 may utilize one or more tones (e.g., one or more frequency resources, such as one or more subcarriers, RBs, REs, or the like) within a TR allocation 320 to transmit one or more peak-cancelation signals to reduce a PAPR of the PDSCH transmission. For example, the TR allocation 320 may fall within a boundary 315-a between the downlink resources 305-a and the uplink resources 310-a. The network entity 105 may use TR techniques in which the TR allocation 320 may fully overlap with the PDSCH allocation 325 (which may be referred to as "full TR"). That is, the network entity 105 may indicate (e.g., dynamically indicate) for the UE 115 to use full TR techniques. In some examples, the UE 115 may receive control signaling that may configure the UE 115 to use full TR techniques for downlink transmissions.

As illustrated with reference to the resource diagram 300-b, in a SBFD slot, a UE 115 or a network entity 105 may utilize downlink resources 305 (e.g., downlink resources 305-c and downlink resources 305-d) and uplink resources 310 (e.g., uplink resources 310-b), which may overlap in time with the downlink resources 305. In some examples, the network entity 105 may use a PDSCH allocation 325 within the downlink resources 305-c (e.g., or within the downlink resources 305-c) to transmit a PDSCH to the UE 115.

In some implementations, the network entity 105 may utilize one or more tones within a TR allocation 320 to transmit one or more peak-cancelation signals to reduce a PAPR of the PDSCH transmission. For example, the TR allocation 320 may fall within a boundary 315-b between the downlink resources 305-c and the uplink resources 310-b. The network entity 105 may use TR techniques in which the TR allocation 320 may partially overlap with the PDSCH allocation 325 (with may be referred to as "partial TR"). That is, the network entity 105 may indicate (e.g., dynamically indicate) for the UE 115 to use partial TR techniques. In some examples, the UE 115 may receive control signaling that may configure the UE 115 to use partial TR techniques for downlink transmissions.

Although the TR techniques are illustrated herein with reference to downlink transmissions, the UE 115 may use full or partial TR techniques for an uplink transmission (e.g., a PUSCH transmission). For example, the UE 115 may identify a configuration for a TR allocation 320 within a boundary 315 between uplink resources 310 and downlink resources 305. The TR allocation 320 may overlap partially or fully with a PUSCH allocation. That is, the UE 115 may identify an indication or a configuration to use partial or full TR techniques for uplink transmissions.

In some examples, the network entity 105-a may define the boundary 315 to the UE 115-a as a quantity of RBs. For example, the quantity of RBs may be associated with a numerology (e.g., an SCS and a cyclic prefix) of a carrier used by the UE 115-a. In some examples, the network entity 105-a may define the boundary 315 to the UE 115-a as one or more frequency bands.

Figure 4:
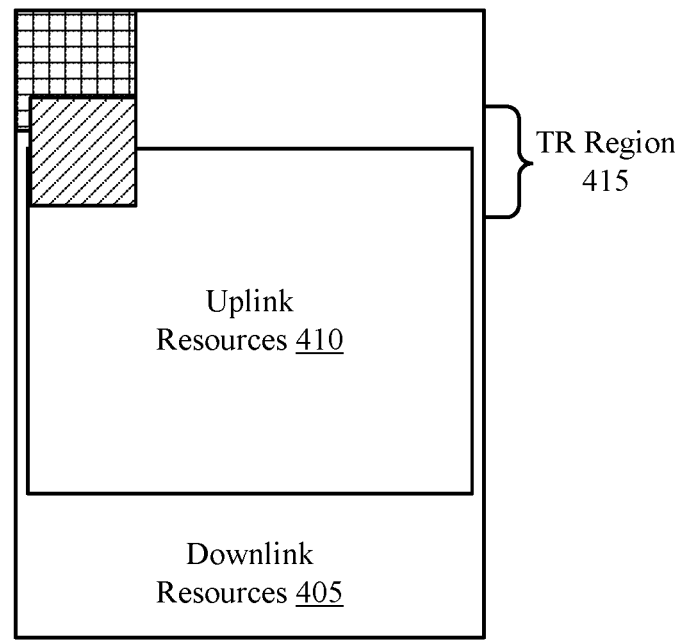
FIG. 4 shows an example of a resource diagram that supports TR techniques in full-duplex networks in accordance with one or more aspects of the present disclosure.
Figure 4:
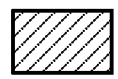
Figure 4:

FIG. 4 shows an example of a resource diagram 400 that supports TR techniques in full-duplex networks in accordance with one or more aspects of the present disclosure. The resource diagram 400 may implement or may be implemented by aspects of the wireless communications system 100, the wireless communications system 200, the resource diagram 300-a, or the resource diagram 300-b. For example, the resource diagram 400 may include a UE 115 or a network entity 105, which may be examples of the corresponding devices as described with reference to FIG. 1.

In an IBFD slot, a UE 115 or a network entity 105 may utilize downlink resources 405 and uplink resources 410, which may overlap in time and frequency with the downlink resources 405. In some examples, the network entity 105 may use a PDSCH allocation 425 within the downlink resources 405 to transmit a PDSCH to the UE 115.

In some implementations, the network entity 105 may utilize one or more tones (e.g., one or more frequency resources, such as one or more subcarriers, RBs, REs, or the like) within a TR allocation 420 to transmit one or more peak-cancelation signals to reduce a PAPR of the PDSCH transmission. For example, the TR allocation 420 may fall within a region 415, which may include a frequency overlap between the downlink resources 405 and the uplink resources 410. The network entity 105 may use partial or full TR techniques in which the TR allocation 420 may partially or fully overlap with the PDSCH allocation 425, respectively. That is, the network entity 105 may indicate (e.g., dynamically indicate) for the UE 115 to use partial or full TR techniques. In some examples, the UE 115 may receive control signaling that may configure the UE 115 to use partial or full TR techniques for downlink transmissions.

Although the TR techniques are illustrated herein with reference to downlink transmissions, the UE 115 may use full or partial TR techniques for an uplink transmission (e.g., a PUSCH transmission). For example, the UE 115 may identify a configuration for a TR allocation 420 within a region 415, which may include an overlap between uplink resources 410 and downlink resources 405. The TR allocation 420 may overlap partially or fully with a PUSCH allocation. That is, the UE 115 may identify an indication or a configuration to use partial or full TR techniques for uplink transmissions.

Figure 5:
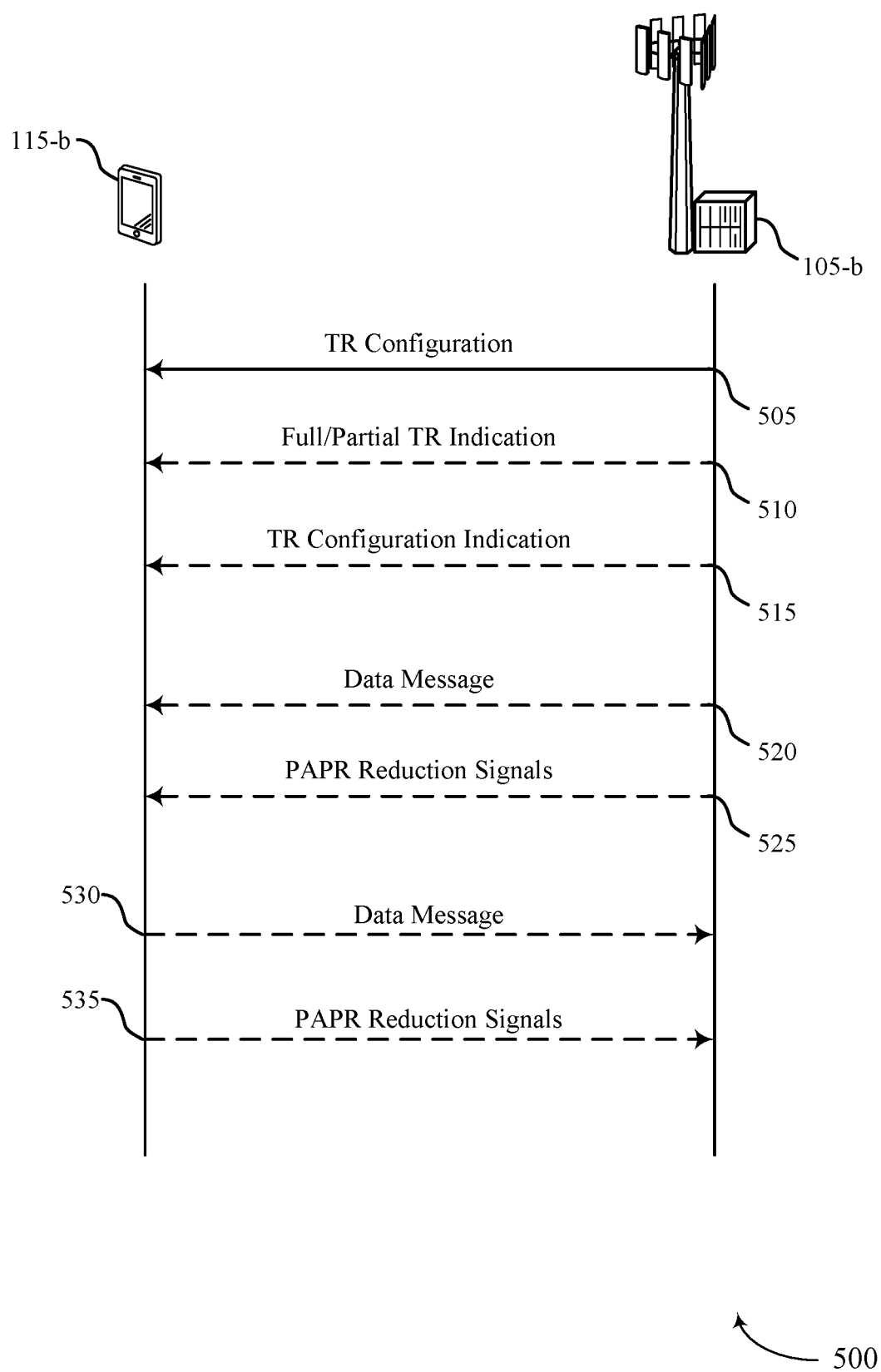
FIG. 5 shows an example of a process flow that supports TR techniques in full-duplex networks in accordance with one or more aspects of the present disclosure.

FIG. 5 shows an example of a process flow 500 that supports TR techniques in full-duplex networks in accordance with one or more aspects of the present disclosure. The process flow 500 may implement or may be implemented by aspects of the wireless communications system 100, the wireless communications system 200, the resource diagram 300-a, the resource diagram 300-b, or the resource diagram 400. For example, the process flow 500 may include a UE 115-b or a network entity 105-b, which may be examples of the corresponding devices as described with reference to FIG. 1.

In the following description of the process flow 500, the operations between the UE 115-b and the network entity 105-b may be transmitted in a different order than the example order shown. Some operations may also be omitted from the process flow 500, and other operations may be added to the process flow 500. Further, although some operations or signaling may be shown to occur at different times for discussion purposes, these operations may actually occur at the same time.

At 505, the UE 115-b may receive, from the network entity 105-b, a control message indicating a configuration for a first set of frequency resources reserved for TR during a full-duplex time interval (e.g., a SBFD slot, an IBFD slot, a set of OFDM symbols including resources configured for full-duplex communications). The control message may be, for example, a DCI message, an RRC message, or a medium access control-control element (MAC-CE). The network entity 105-b may, additionally, or alternatively, transmit an indication of one or more resource configurations for the UE 115-b to use for TR in one or more half-duplex time intervals. In some examples, the UE 115-b may identify the first set of frequency resources as a quantity of RBs associated with an SCS configuration. Additionally, or alternatively, the UE 115-b may identify the first set of frequency resources as one or more frequency bands.

In some examples, the first set of frequency resources may be resources within a frequency range corresponding to a boundary between a downlink frequency subband and an uplink frequency subband. In some examples, the first set of frequency resources may be resources within a frequency range corresponding to an overlap between the downlink frequency subband and the uplink frequency subband. The first set of frequency resources may be resources reserved for one or more peak-cancelation signals dedicated for PAPR reduction for one or more data transmissions.

In some examples, at 510, the network entity 105-b may transmit, to the UE 115-b, an indication for the UE 115-b to use full TR or partial TR techniques. That is, the indication may indicate that the first set of frequency resources partially or fully overlaps with a second set of frequency resources. In some examples, the indication may indicate a second configuration for receiving the one or more data messages using partial TR or full TR techniques. The network entity 105-b may transmit the indication based on determining to use partial TR or full TR techniques. In some examples, the second set of frequency resources may be resources reserved for transmitting or receiving one or more data messages (e.g., PDSCH transmissions or PUSCH transmissions). The UE 115-b may determine to use partial TR or full TR techniques based on the indication. The indication may be, for example, in a DCI message, an RRC message, or a MAC-CE message.

In some examples, at 515, the network entity 105-b may transmit, to the UE 115-b, a second control message indicating for the UE 115-b to use the first set of frequency resources for TR in the full-duplex time interval rather than a set of frequency resources associated with an additional tone reservation configuration. In some examples, the first set of frequency resources may be associated with the tone reservation configuration for one or more half-duplex time intervals. In such examples, the additional tone reservation configuration may be a configuration specific to full-duplex time intervals. In some examples, the additional tone reservation may be the tone reservation configuration for one or more half-duplex time intervals.

In some examples, at 520, the UE 115-b may receive the one or more data messages via the second set of frequency resources. That is, the network entity 105-*b* may transmit one or more downlink data messages to the UE 115-*b* via the second set of frequency resources. The UE 115-*b* may receive the one or more data messages based on the control message, the indication, the second control message, or some combination thereof. The network entity 105-*b* may transmit the one or more data messages via the downlink subband during the full-duplex time interval. In some examples, the UE 115-*b* may transmit one or more other data messages via the uplink subband during the full-duplex time interval.

In some examples, at 525, the UE 115-*b* may receive one or more signals via the first set of frequency resources. For example, the one or more signals may be TR signals configured to reduce a PAPR of the one or more downlink data messages. The network entity 105-*b* may transmit the one or more signals via one or more tones within the first set of frequency resources. In some examples, the one or more tones may have a relatively lower channel quality than one or more tones that do not fall within the first set of frequency resources (e.g., due to self-interference or CLI). The UE 115-*b* may receive the one or more signals based on the control message, the indication, the second control message, or some combination thereof.

In some examples, at 530, the network entity 105-*b* may receive the one or more data messages via the second set of frequency resources. That is, the UE 115-*b* may transmit one or more uplink data messages to the network entity 105-*b* via the second set of frequency resources. The network entity 105-*b* may receive the one or more data messages based on the control message, the indication, the second control message, or some combination thereof. The UE 115-*b* may transmit the one or more data messages via the uplink subband during the full-duplex time interval. In some examples, the network entity 105-*b* may transmit one or more downlink messages via the downlink subband during the full-duplex time interval.

In some examples, at 535, the network entity 105-*b* may receive one or more signals via the first set of frequency resources. For example, the one or more signals may be TR signals configured to reduce a PAPR of the one or more uplink data messages. The UE 115-*b* may transmit the one or more signals via one or more tones within the first set of frequency resources. In some examples, the one or more tones may have a relatively lower channel quality than one or more tones that do not fall within the first set of frequency resources (e.g., due to self-interference or CLI). The network entity 105-*b* may receive the one or more signals based on the control message, the indication, the second control message, or some combination thereof.

Figure 6:
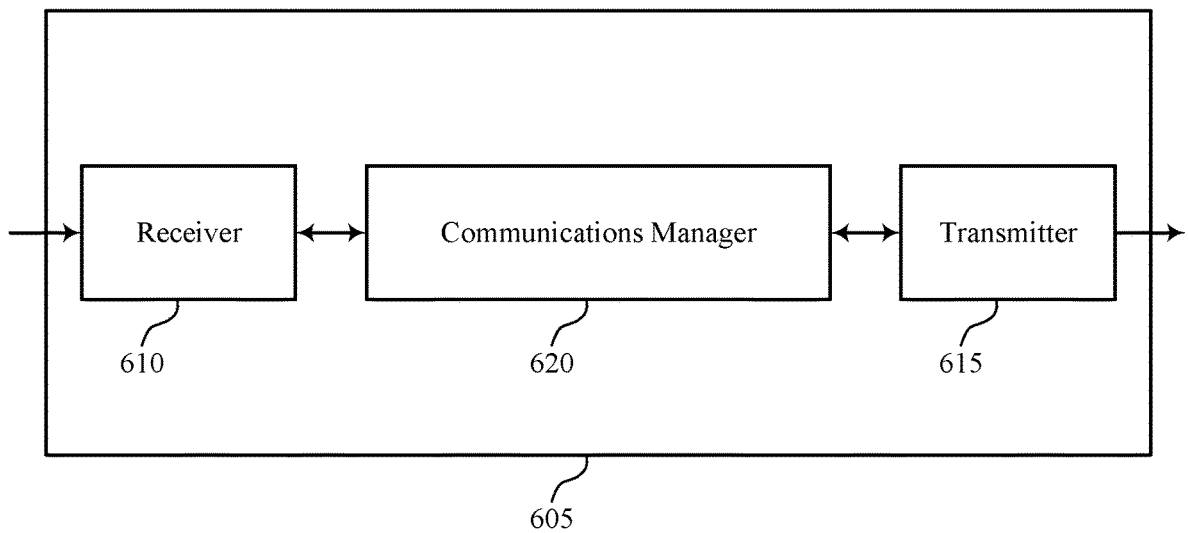
FIGS. 6 and 7 show block diagrams of devices that support TR techniques in full-duplex networks in accordance with one or more aspects of the present disclosure.

FIG. 6 shows a block diagram 600 of a device 605 that supports TR techniques in full-duplex networks in accordance with one or more aspects of the present disclosure. The device 605 may be an example of aspects of a wireless device (e.g., a UE, a network entity) as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to TR techniques in full-duplex networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to TR techniques in full-duplex networks). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of TR techniques in full-duplex networks as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions or code stored in the at least one memory). The one or more processors executing the instructions or code to perform the one or more of the functions described herein can refer to the one or more processors performing the one or more of the functions according to the instructions or code.

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 is capable of, configured to, or operable to support a means for receiving a control message indicating a configuration of a first set of frequency resources for TR during a full-duplex time interval. The communications manager 620 is capable of, configured to, or operable to support a means for receiving, during the full-duplex time interval, one or more data messages via a second set of frequency resources that at least partially overlaps with the first set of frequency resources. The communications manager 620 is capable of, configured to, or operable to support a means for receiving, during the full-duplex time interval, one or more signals via the first set of frequency resources, where the one or more signals are configured to reduce a PAPR associated with the one or more data messages.

Additionally, or alternatively, the communications manager 620 may support wireless communications in accordance with examples as disclosed herein. For example, the communications manager 620 is capable of, configured to, or operable to support a means for receiving a control message indicating a configuration of a first set of frequency resources for TR during a full-duplex time interval. The communications manager 620 is capable of, configured to, or operable to support a means for transmitting, during the full-duplex time interval, one or more data messages via a second set of frequency resources that at least partially overlap with the first set of frequency resources in a time domain. The communications manager 620 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 620 may support wireless communications in accordance with examples as disclosed herein. For example, the communications manager 620 is capable of, configured to, or operable to support a means for transmitting a control message indicating a configuration of a first set of frequency resources for TR during a full-duplex time interval. The communications manager 620 is capable of, configured to, or operable to support a means for transmitting, during the full-duplex time interval, one or more data messages via a second set of frequency resources that at least partially overlaps with the first set of frequency resources. The communications manager 620 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 620 may support wireless communications in accordance with examples as disclosed herein. For example, the communications manager 620 is capable of, configured to, or operable to support a means for transmitting a control message indicating a configuration of a first set of frequency resources for TR during a full-duplex time interval. The communications manager 620 is capable of, configured to, or operable to support a means for receiving, during the full-duplex time interval, one or more data messages via a second set of frequency resources that at least partially overlap with the first set of frequency resources in a time domain. The communications manager 620 is capable of, configured to, or operable to support a means for receiving, during the full-duplex time interval, one or more signals via the first set of frequency resources, where the one or more signals are configured to reduce a PAPR associated with the one or more data messages.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for TR in full-duplex slots, which may allow for more efficient utilization of communication resources. In particular, by including or configuring the communications manager 620 in accordance with examples as described herein, the device 605 may enable the re-use of tones that may otherwise be affected by poor channel quality for data signaling, where such tones may be used for TR signaling to improve the quality of data communicated via full-duplex resources. As such, communications reliability and robustness may increase, with inconsequential or relatively minimal loss of communications bandwidth used for TR signaling.

Figure 7:
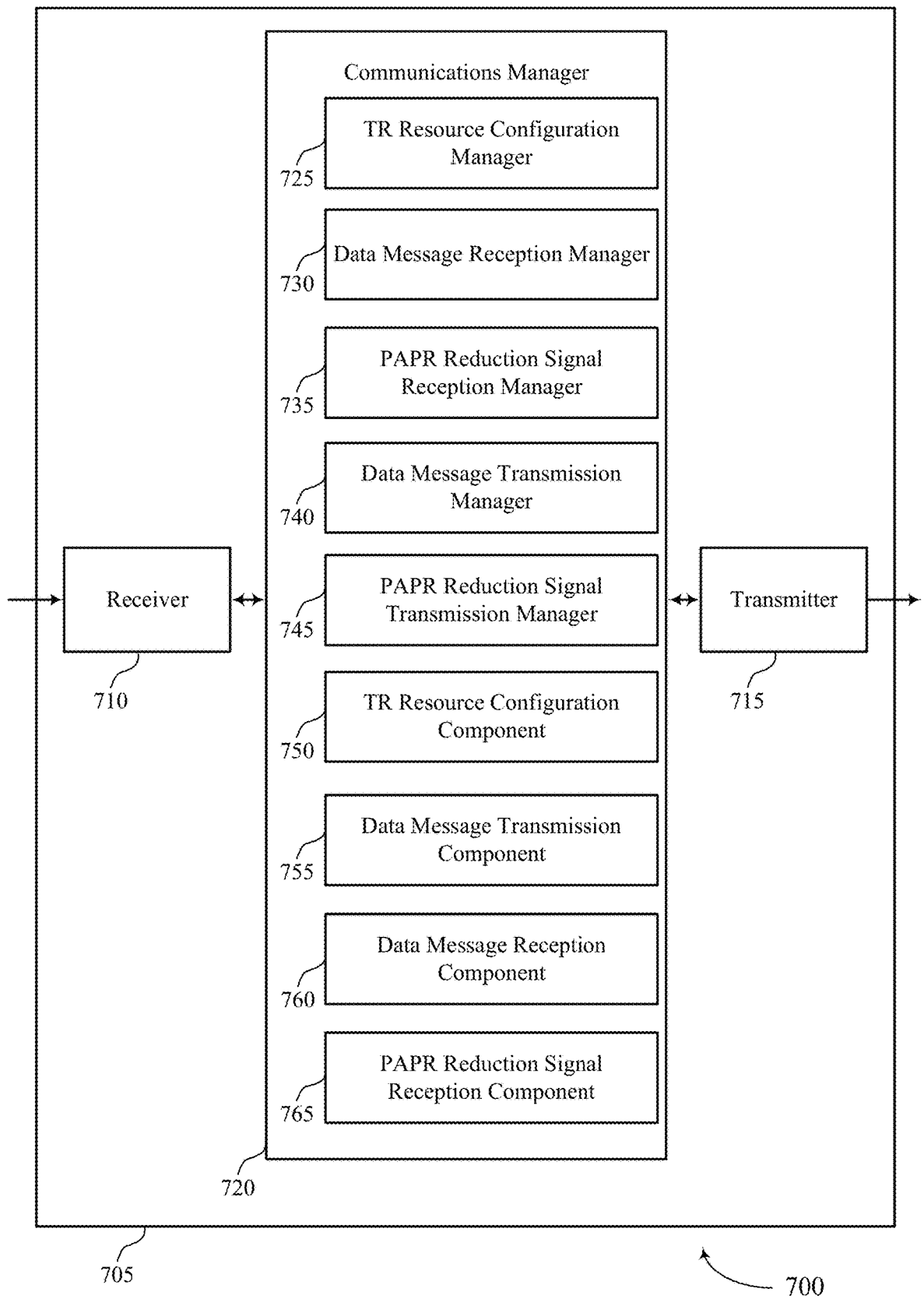

FIG. 7 shows a block diagram 700 of a device 705 that supports TR techniques in full-duplex networks in accordance with one or more aspects of the present disclosure. The device 705 may be an example of aspects of a device 605 or a wireless device (e.g., a UE, a network entity) as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to TR techniques in full-duplex networks). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to TR techniques in full-duplex networks). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of TR techniques in full-duplex networks as described herein. For example, the communications manager 720 may include a TR resource configuration manager 725, a data message reception manager 730, a PAPR reduction signal reception manager 735, a data message transmission manager 740, a PAPR reduction signal transmission manager 745, a TR resource configuration component 750, a data message transmission component 755, a data message reception component 760, a PAPR reduction signal reception component 765, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The TR resource configuration manager 725 is capable of, configured to, or operable to support a means for receiving a control message indicating a configuration of a first set of frequency resources for TR during a full-duplex time interval. The data message reception manager 730 is capable of, configured to, or operable to support a means for receiving, during the full-duplex time interval, one or more data messages via a second set of frequency resources that at least partially overlaps with the first set of frequency resources. The PAPR reduction signal reception manager 735 is capable of, configured to, or operable to support a means for receiving, during the full-duplex time interval, one or more signals via the first set of frequency resources, where the one or more signals are configured to reduce a PAPR associated with the one or more data messages.

Additionally, or alternatively, the communications manager 720 may support wireless communications in accordance with examples as disclosed herein. The TR resource configuration manager 725 is capable of, configured to, or operable to support a means for receiving a control message indicating a configuration of a first set of frequency resources for TR during a full-duplex time interval. The data message transmission manager 740 is capable of, configured to, or operable to support a means for transmitting, during the full-duplex time interval, one or more data messages via a second set of frequency resources that at least partially overlap with the first set of frequency resources in a time domain. The PAPR reduction signal transmission manager 745 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 720 may support wireless communications in accordance with examples as disclosed herein. The TR resource configuration component 750 is capable of, configured to, or operable to support a means for transmitting a control message indicating a configuration of a first set of frequency resources for TR during a full-duplex time interval. The data message transmission component 755 is capable of, configured to, or operable to support a means for transmitting, during the full-duplex time interval, one or more data messages via a second set of frequency resources that at least partially overlaps with the first set of frequency resources. The PAPR reduction signal transmission manager 745 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 720 may support wireless communications in accordance with examples as disclosed herein. The TR resource configuration component 750 is capable of, configured to, or operable to support a means for transmitting a control message indicating a configuration of a first set of frequency resources for TR during a full-duplex time interval. The data message reception component 760 is capable of, configured to, or operable to support a means for receiving, during the full-duplex time interval, one or more data messages via a second set of frequency resources that at least partially overlap with the first set of frequency resources in a time domain. The PAPR reduction signal reception component 765 is capable of, configured to, or operable to support a means for receiving, during the full-duplex time interval, one or more signals via the first set of frequency resources, where the one or more signals are configured to reduce a PAPR associated with the one or more data messages.

Figure 8:
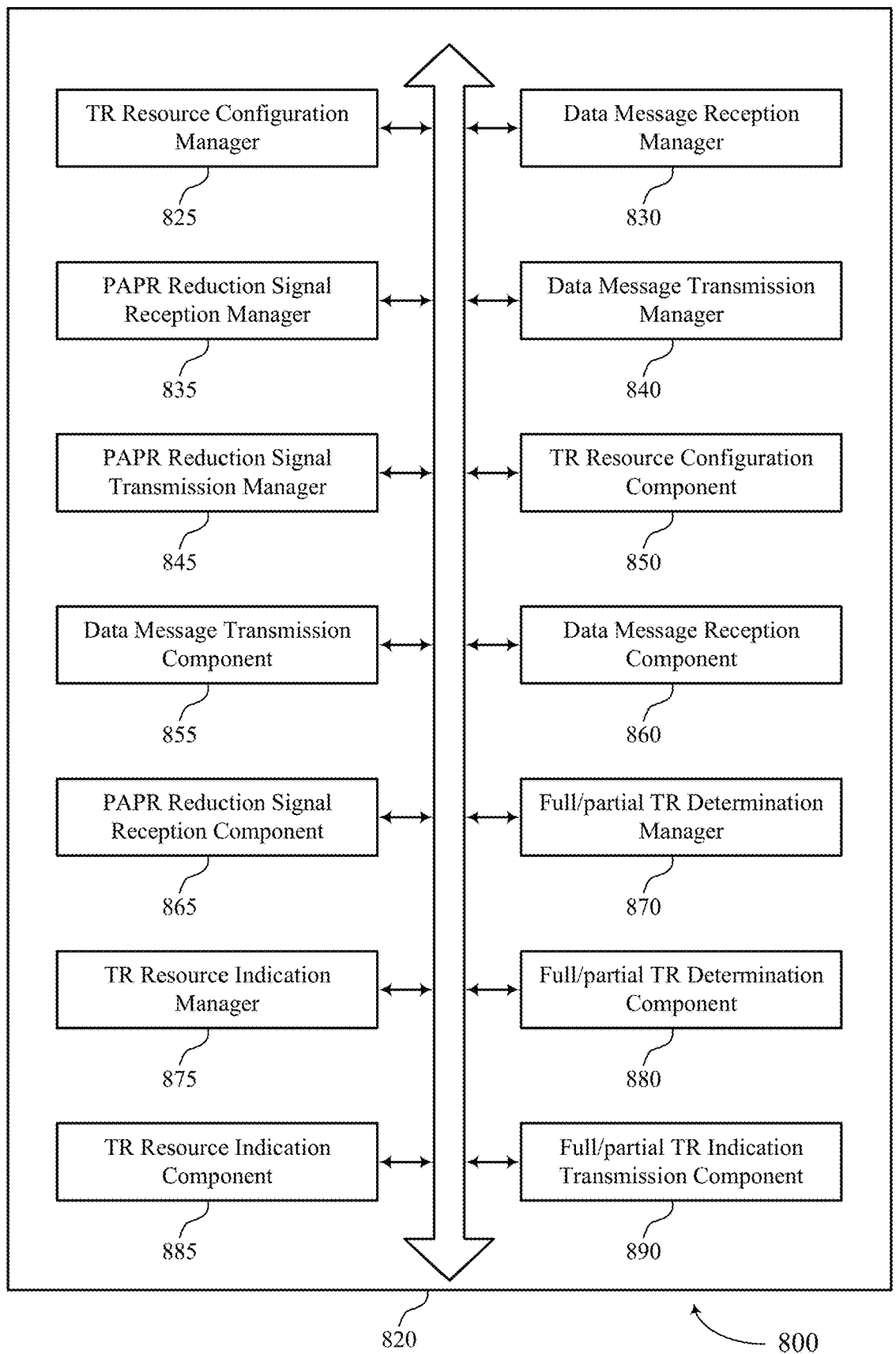
FIG. 8 shows a block diagram of a communications manager that supports TR techniques in full-duplex networks in accordance with one or more aspects of the present disclosure.

FIG. 8 shows a block diagram 800 of a communications manager 820 that supports TR techniques in full-duplex networks in accordance with one or more aspects of the present disclosure. The communications manager 820 may be an example of aspects of a communications manager 620, a communications manager 720, or both, as described herein. The communications manager 820, or various components thereof, may be an example of means for performing various aspects of TR techniques in full-duplex networks as described herein. For example, the communications manager 820 may include a TR resource configuration manager 825, a data message reception manager 830, a PAPR reduction signal reception manager 835, a data message transmission manager 840, a PAPR reduction signal transmission manager 845, a TR resource configuration component 850, a data message transmission component 855, a data message reception component 860, a PAPR reduction signal reception component 865, a full/partial TR determination manager 870, a TR resource indication manager 875, a full/partial TR determination component 880, a TR resource indication component 885, a full/partial TR indication transmission component 890, or any combination thereof. Each of these components, or components or subcomponents thereof (e.g., one or more processors, one or more memories), may communicate, directly or indirectly, with one another (e.g., via one or more buses).

The communications manager 820 may support wireless communications in accordance with examples as disclosed herein. The TR resource configuration manager 825 is capable of, configured to, or operable to support a means for receiving a control message indicating a configuration of a first set of frequency resources for TR during a full-duplex time interval. The data message reception manager 830 is capable of, configured to, or operable to support a means for receiving, during the full-duplex time interval, one or more data messages via a second set of frequency resources that at least partially overlaps with the first set of frequency resources. The PAPR reduction signal reception manager 835 is capable of, configured to, or operable to support a means for receiving, during the full-duplex time interval, one or more signals via the first set of frequency resources, where the one or more signals are configured to reduce a PAPR associated with the one or more data messages.

In some examples, the full/partial TR determination manager 870 is capable of, configured to, or operable to support a means for determining that the first set of frequency resources at least partially overlaps with the second set of frequency resources in a frequency domain, where receiving the one or more data messages and the one or more signals is based on the determination.

In some examples, the full/partial TR determination manager 870 is capable of, configured to, or operable to support a means for receiving an indication that the first set of frequency resources partially overlaps with the second set of frequency resources in the frequency domain, where determining that the first set of frequency resources at least partially overlaps with the second set of frequency resources in the frequency domain is based on the indication.

In some examples, the full/partial TR determination manager 870 is capable of, configured to, or operable to support a means for receiving an indication that the first set of frequency resources fully overlaps with the second set of frequency resources in the frequency domain, where determining that the first set of frequency resources at least partially overlaps with the second set of frequency resources in the frequency domain is based on the indication.

In some examples, the TR resource indication manager 875 is capable of, configured to, or operable to support a means for receiving an indication of a second configuration for receiving the one or more data messages and the one or more signals via partially overlapping resources or via fully overlapping resources, or both, where determining that the first set of frequency resources at least partially overlaps with the second set of frequency resources in the frequency domain is based on the second configuration.

In some examples, the TR resource configuration manager 825 is capable of, configured to, or operable to support a means for identifying a quantity of RBs including the first set of frequency resources based on the configuration, the quantity of RBs being associated with a subcarrier spacing configuration, where the one or more signals are received via the quantity of RBs.

In some examples, the TR resource configuration manager 825 is capable of, configured to, or operable to support a means for identifying one or more frequency bands including the first set of frequency resources based on the configuration, where the one or more signals are received via the one or more frequency bands.

In some examples, the TR resource indication manager 875 is capable of, configured to, or operable to support a means for receiving a second control message associated with the one or more data messages, the second control message indicating that the one or more signals are to be received via the first set of frequency resources, where the one or more signals are received in accordance with the second control message.

In some examples, the TR resource indication manager 875 is capable of, configured to, or operable to support a means for determining that the one or more signals are to be received via the first set of frequency resources based on a TR configuration associated with one or more half-duplex time intervals, where the one or more signals are received based on the determination.

In some examples, the first set of frequency resources include resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

In some examples, the first set of frequency resources include resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval. In some examples, the first frequency bandwidth at least partially overlaps with the second frequency bandwidth.

In some examples, the one or more data messages include uplink data messages (e.g., one or more PUSCH transmissions). In some examples, the one or more data messages include downlink data messages (e.g., one or more PDSCH transmissions).

Additionally, or alternatively, the communications manager 820 may support wireless communications in accordance with examples as disclosed herein. In some examples, the TR resource configuration manager 825 is capable of, configured to, or operable to support a means for receiving a control message indicating a configuration of a first set of frequency resources for TR during a full-duplex time interval. The data message transmission manager 840 is capable of, configured to, or operable to support a means for transmitting, during the full-duplex time interval, one or more data messages via a second set of frequency resources that at least partially overlap with the first set of frequency resources in a time domain. The PAPR reduction signal transmission manager 845 is capable of, configured to, or operable to support a means for transmitting, during the full-duplex time interval, one or more signals via the first set of frequency resources, where the one or more signals are configured to reduce a PAPR associated with the one or more data messages.

In some examples, the full/partial TR determination manager 870 is capable of, configured to, or operable to support a means for determining that the first set of frequency resources at least partially overlaps with the second set of frequency resources in a frequency domain, where transmitting the one or more data messages and the one or more signals is based on the determination.

In some examples, the full/partial TR determination manager 870 is capable of, configured to, or operable to support a means for receiving an indication that the first set of frequency resources partially overlaps with the second set of frequency resources in the frequency domain, where determining that the first set of frequency resources at least partially overlaps with the second set of frequency resources in the frequency domain is based on the indication.

In some examples, the full/partial TR determination manager 870 is capable of, configured to, or operable to support a means for receiving an indication that the first set of frequency resources fully overlaps with the second set of frequency resources in the frequency domain, where determining that the first set of frequency resources at least partially overlaps with the second set of frequency resources in the frequency domain is based on the indication.

In some examples, the TR resource indication manager 875 is capable of, configured to, or operable to support a means for receiving an indication of a second configuration for transmitting the one or more data messages and the one or more signals via partially overlapping resources or via fully overlapping resources, or both, where determining that the first set of frequency resources at least partially overlaps with the second set of frequency resources in the frequency domain is based on the second configuration.

In some examples, the TR resource configuration manager 825 is capable of, configured to, or operable to support a means for identifying a quantity of RBs including the first set of frequency resources based on the configuration, the quantity of RBs being associated with a subcarrier spacing, where the one or more signals are transmitted via the quantity of RBs.

In some examples, the TR resource configuration manager 825 is capable of, configured to, or operable to support a means for identifying one or more frequency bands including the first set of frequency resources based on the configuration, where the one or more signals are transmitted via the one or more frequency bands.

In some examples, the TR resource indication manager 875 is capable of, configured to, or operable to support a means for receiving a second control message associated with the one or more data messages, the second control message indicating that the one or more signals are to be transmitted via the first set of frequency resources, where the one or more signals are transmitted in accordance with the second control message.

In some examples, the TR resource indication manager 875 is capable of, configured to, or operable to support a means for determining that the one or more signals are to be transmitted via the first set of frequency resources based on a TR configuration associated with one or more half-duplex time intervals, where the one or more signals are transmitted based on the determination.

In some examples, the first set of frequency resources include resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

In some examples, the first set of frequency resources include resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval. In some examples, the first frequency bandwidth at least partially overlaps with the second frequency bandwidth.

In some examples, the one or more data messages include uplink data messages (e.g., uplink data transmitted via an uplink channel, such as PUSCH, PUCCH, or the like). In some examples, the one or more data messages include downlink data messages (e.g., downlink data transmitted via a downlink channel, such as PDSCH, PDCCH, or the like).

Additionally, or alternatively, the communications manager 820 may support wireless communications in accordance with examples as disclosed herein. The TR resource configuration component 850 is capable of, configured to, or operable to support a means for transmitting a control message indicating a configuration of a first set of frequency resources for TR during a full-duplex time interval. The data message transmission component 855 is capable of, configured to, or operable to support a means for transmitting, during the full-duplex time interval, one or more data messages via a second set of frequency resources that at least partially overlaps with the first set of frequency resources. In some examples, the PAPR reduction signal transmission manager 845 is capable of, configured to, or operable to support a means for transmitting, during the full-duplex time interval, one or more signals via the first set of frequency resources, where the one or more signals are configured to reduce a PAPR associated with the one or more data messages.

In some examples, the full/partial TR determination component 880 is capable of, configured to, or operable to support a means for determining that the first set of frequency resources at least partially overlaps with the second set of frequency resources in a frequency domain, where transmitting the one or more data messages and the one or more signals is based on the determination.

In some examples, the full/partial TR indication transmission component 890 is capable of, configured to, or operable to support a means for transmitting an indication that the first set of frequency resources partially overlaps with the second set of frequency resources in the frequency domain based on the determination.

In some examples, the full/partial TR indication transmission component 890 is capable of, configured to, or operable to support a means for transmitting an indication that the first set of frequency resources fully overlaps with the second set of frequency resources in the frequency domain based on the determination.

In some examples, the full/partial TR indication transmission component 890 is capable of, configured to, or operable to support a means for transmitting an indication of a second configuration for receiving the one or more data messages and the one or more signals via partially overlapping resources or via fully overlapping resources, or both, based on the determination.

In some examples, the TR resource indication component 885 is capable of, configured to, or operable to support a means for transmitting a second control message associated with the one or more data messages, the second control message indicating that the one or more signals are to be received via the first set of frequency resources, where the one or more signals are transmitted in accordance with the second control message.

In some examples, the TR resource indication component 885 is capable of, configured to, or operable to support a means for transmitting an indication of a TR configuration associated with one or more half-duplex time intervals, where the one or more signals are transmitted based on the TR configuration associated with the one or more half-duplex time intervals.

In some examples, the first set of frequency resources is defined by a quantity of RBs associated with a subcarrier spacing configuration, or one or more frequency bands, or any combination thereof.

Additionally, or alternatively, the communications manager 820 may support wireless communications in accordance with examples as disclosed herein. In some examples, the TR resource configuration component 850 is capable of, configured to, or operable to support a means for transmitting a control message indicating a configuration of a first set of frequency resources for TR during a full-duplex time interval. The data message reception component 860 is capable of, configured to, or operable to support a means for receiving, during the full-duplex time interval, one or more data messages via a second set of frequency resources that at least partially overlap with the first set of frequency resources in a time domain. The PAPR reduction signal reception component 865 is capable of, configured to, or operable to support a means for receiving, during the full-duplex time interval, one or more signals via the first set of frequency resources, where the one or more signals are configured to reduce a PAPR associated with the one or more data messages.

In some examples, the full/partial TR determination component 880 is capable of, configured to, or operable to support a means for determining that the first set of frequency resources at least partially overlaps with the second set of frequency resources in a frequency domain, where transmitting the one or more data messages and the one or more signals is based on the determination.

In some examples, the full/partial TR indication transmission component 890 is capable of, configured to, or operable to support a means for transmitting an indication that the first set of frequency resources partially overlaps with the second set of frequency resources in the frequency domain based on the determination.

In some examples, the full/partial TR indication transmission component 890 is capable of, configured to, or operable to support a means for transmitting an indication that the first set of frequency resources fully overlaps with the second set of frequency resources in the frequency domain based on the determination.

In some examples, the TR resource indication component 885 is capable of, configured to, or operable to support a means for transmitting an indication of a second configuration for transmitting the one or more data messages and the one or more signals via partially overlapping resources or via fully overlapping resources, or both, based on the determination.

In some examples, the TR resource indication component 885 is capable of, configured to, or operable to support a means for transmitting a second control message associated with the one or more data messages, the second control message indicating that the one or more signals are to be transmitted via the first set of frequency resources, where the one or more signals are received in accordance with the second control message.

In some examples, the TR resource indication component 885 is capable of, configured to, or operable to support a means for transmitting an indication of a TR configuration associated with one or more half-duplex time intervals, where the one or more signals are received based on the TR configuration associated with the one or more half-duplex time intervals.

In some examples, the first set of frequency resources is defined by a quantity of RBs associated with a subcarrier spacing configuration, or one or more frequency bands, or any combination thereof.

Figure 9:
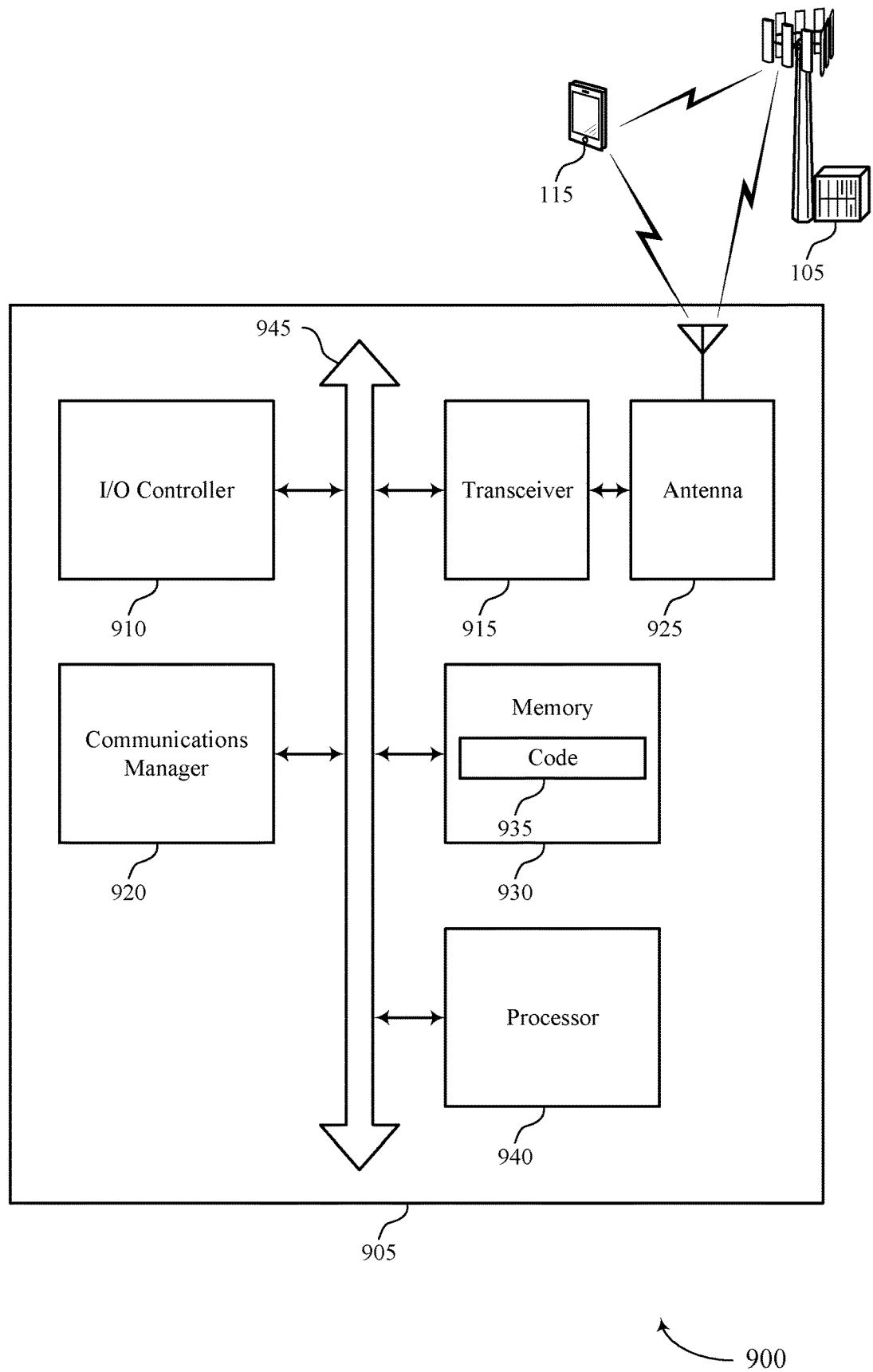
FIG. 9 shows a diagram of a system including a device that supports TR techniques in full-duplex networks in accordance with one or more aspects of the present disclosure.

FIG. 9 shows a diagram of a system 900 including a device 905 that supports TR techniques in full-duplex networks in accordance with one or more aspects of the present disclosure. The device 905 may be an example of or include the components of a device 605, a device 705, or a wireless device (e.g., a UE, a network entity) as described herein. For example, the device 905 may be an example of a UE 115 or a network entity 105, as described with reference to FIG. 1. The device 905 may include components for bi-directional voice and data communications including components for transmitting and receiving communications, such as a communications manager 920, an I/O controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random-access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a BIOS which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting TR techniques in full-duplex networks). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein.

The communications manager 920 may support wireless communications in accordance with examples as disclosed herein. For example, the communications manager 920 is capable of, configured to, or operable to support a means for receiving a control message indicating a configuration of a first set of frequency resources for TR during a full-duplex time interval. The communications manager 920 is capable of, configured to, or operable to support a means for receiving, during the full-duplex time interval, one or more data messages via a second set of frequency resources that at least partially overlaps with the first set of frequency resources. The communications manager 920 is capable of, configured to, or operable to support a means for receiving, during the full-duplex time interval, one or more signals via the first set of frequency resources, where the one or more signals are configured to reduce a PAPR associated with the one or more data messages.

Additionally, or alternatively, the communications manager 920 may support wireless communications in accordance with examples as disclosed herein. For example, the communications manager 920 is capable of, configured to, or operable to support a means for receiving a control message indicating a configuration of a first set of frequency resources for TR during a full-duplex time interval. The communications manager 920 is capable of, configured to, or operable to support a means for transmitting, during the full-duplex time interval, one or more data messages via a second set of frequency resources that at least partially overlap with the first set of frequency resources in a time domain. The communications manager 920 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 920 may support wireless communications in accordance with examples as disclosed herein. For example, the communications manager 920 is capable of, configured to, or operable to support a means for transmitting a control message indicating a configuration of a first set of frequency resources for TR during a full-duplex time interval. The communications manager 920 is capable of, configured to, or operable to support a means for transmitting, during the full-duplex time interval, one or more data messages via a second set of frequency resources that at least partially overlaps with the first set of frequency resources. The communications manager 920 is capable of, configured to, or operable to support a means for transmitting, during the full-duplex time interval, one or more signals via the first set of frequency resources, where the one or more signals are configured to reduce a PAPR associated with the one or more data messages.

Additionally, or alternatively, the communications manager 920 may support wireless communications in accordance with examples as disclosed herein. For example, the communications manager 920 is capable of, configured to, or operable to support a means for transmitting a control message indicating a configuration of a first set of frequency resources for TR during a full-duplex time interval. The communications manager 920 is capable of, configured to, or operable to support a means for receiving, during the full-duplex time interval, one or more data messages via a second set of frequency resources that at least partially overlap with the first set of frequency resources in a time domain. The communications manager 920 is capable of, configured to, or operable to support a means for receiving, during the full-duplex time interval, one or more signals via the first set of frequency resources, where the one or more signals are configured to reduce a PAPR associated with the one or more data messages.

By including or configuring the communications manager 920 in accordance with examples as described herein, the device 905 may support techniques for TR in full-duplex slots, which may allow for improved communication reliability, more efficient utilization of communication resources, and improved coordination between devices. In particular, by including or configuring the communications manager 920 in accordance with examples as described herein, the device 905 may enable the re-use of tones that may otherwise be affected by poor channel quality for data signaling, where such tones may be used for TR signaling to improve the quality of data communicated via full-duplex resources. As such, communications reliability and robustness may increase, with inconsequential or relatively minimal loss of communications bandwidth used for TR signaling.

In some examples, the communications manager 920 may be configured to perform various operations (e.g., receiving, monitoring, transmitting) using or otherwise in cooperation with the transceiver 915, the one or more antennas 925, or any combination thereof. For example, the communications manager 920 may be configured to receive or transmit messages or other signaling as described herein via the transceiver 915. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of TR techniques in full-duplex networks as described herein, or the at least one processor 940 and the at least one memory 930 may be otherwise configured to, individually or collectively, perform or support such operations.

Figure 10:
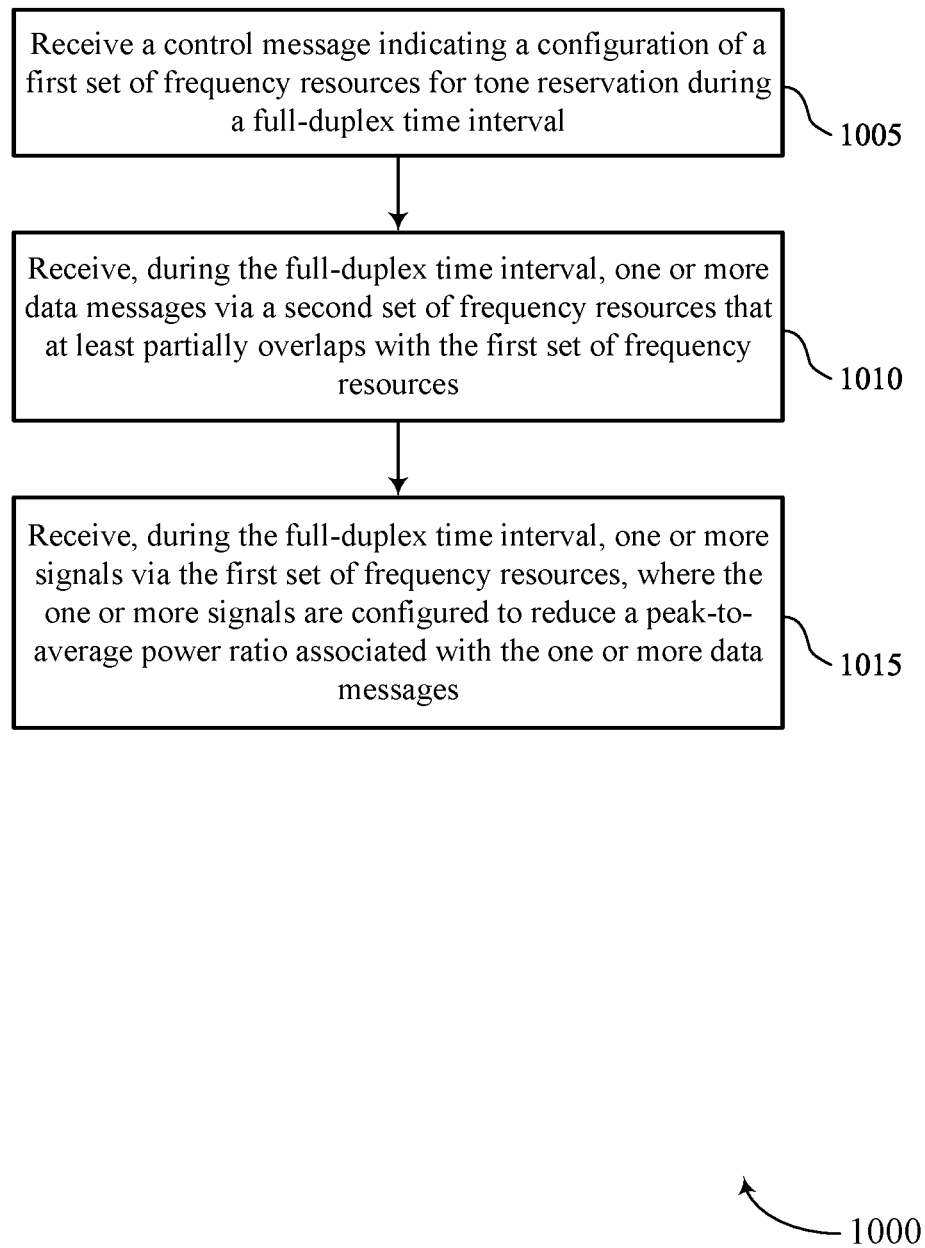
FIGS. 10 through 17 show flowcharts illustrating methods that support TR techniques in full-duplex networks in accordance with one or more aspects of the present disclosure.

FIG. 10 shows a flowchart illustrating a method 1000 that supports TR techniques in full-duplex networks in accordance with aspects of the present disclosure. The operations of the method 1000 may be implemented by a wireless device (e.g., a UE, a network entity) or its components as described herein. For example, the operations of the method 1000 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1005, the method may include receiving a control message indicating a configuration of a first set of frequency resources for TR during a full-duplex time interval. The operations of 1005 may be performed in accordance with examples as disclosed herein. In some examples, aspects of the operations of 1005 may be performed by a TR resource configuration manager 825 as described with reference to FIG. 8.

At 1010, the method may include receiving, during the full-duplex time interval, one or more data messages via a second set of frequency resources that at least partially overlaps with the first set of frequency resources. The operations of 1010 may be performed in accordance with examples as disclosed herein. In some examples, aspects of the operations of 1010 may be performed by a data message reception manager 830 as described with reference to FIG. 8.

At 1015, the method may include receiving, during the full-duplex time interval, one or more signals via the first set of frequency resources, where the one or more signals are configured to reduce a PAPR associated with the one or more data messages. The operations of 1015 may be performed in accordance with examples as disclosed herein. In some examples, aspects of the operations of 1015 may be performed by a PAPR reduction signal reception manager 835 as described with reference to FIG. 8.

Figure 11:
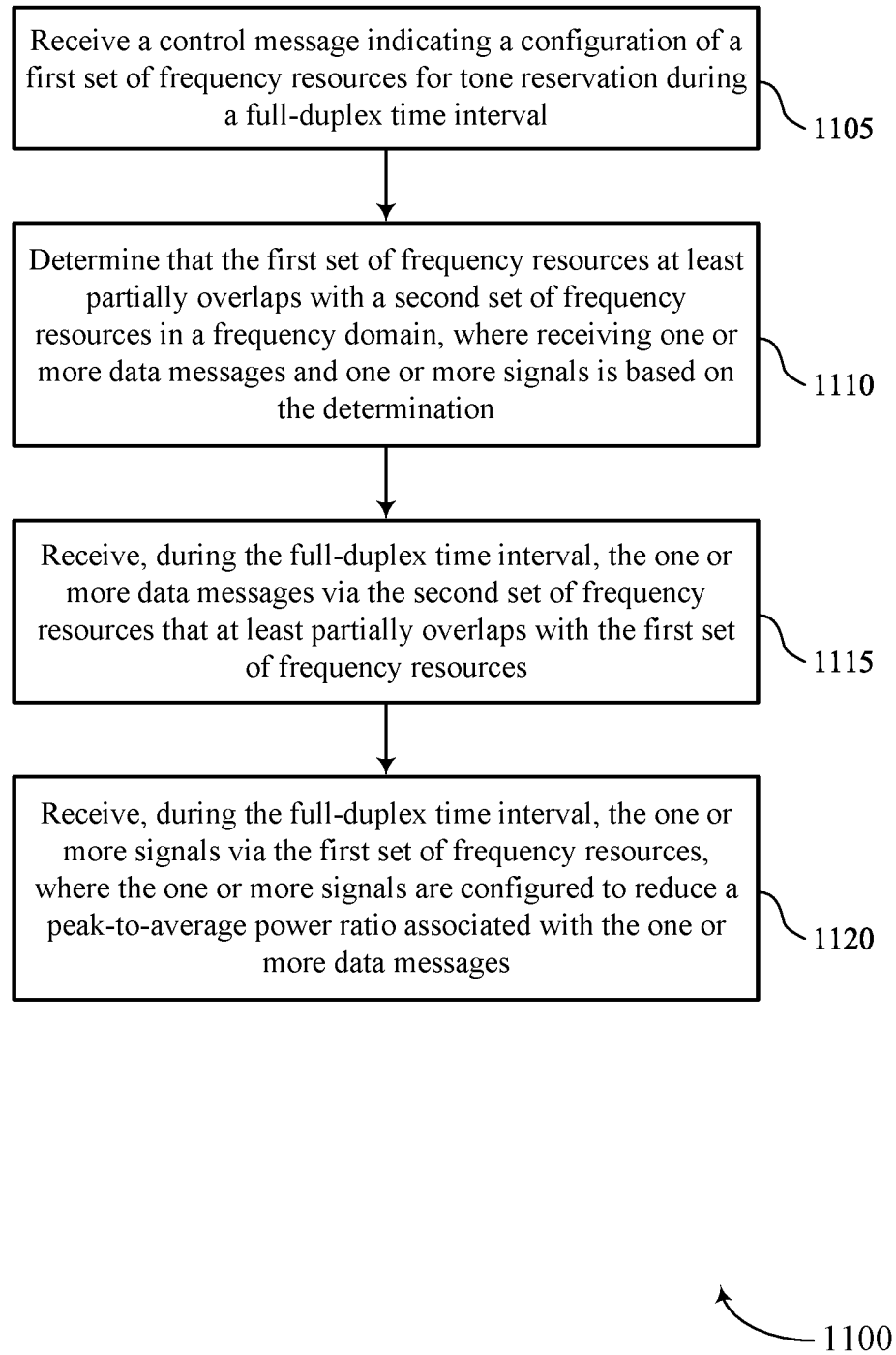

FIG. 11 shows a flowchart illustrating a method 1100 that supports TR techniques in full-duplex networks in accordance with aspects of the present disclosure. The operations of the method 1100 may be implemented by a wireless device (e.g., a UE, a network entity) or its components as described herein. For example, the operations of the method 1100 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1105, the method may include receiving a control message indicating a configuration of a first set of frequency resources for TR during a full-duplex time interval. The operations of 1105 may be performed in accordance with examples as disclosed herein. In some examples, aspects of the operations of 1105 may be performed by a TR resource configuration manager 825 as described with reference to FIG. 8.

At 1110, the method may include determining that the first set of frequency resources at least partially overlaps with a second set of frequency resources in a frequency domain, where receiving one or more data messages and one or more signals is based on the determination. The operations of 1110 may be performed in accordance with examples as disclosed herein. In some examples, aspects of the operations of 1110 may be performed by a full/partial TR determination manager 870 as described with reference to FIG. 8.

At 1115, the method may include receiving, during the full-duplex time interval, the one or more data messages via the second set of frequency resources that at least partially overlaps with the first set of frequency resources. The operations of 1115 may be performed in accordance with examples as disclosed herein. In some examples, aspects of the operations of 1115 may be performed by a data message reception manager 830 as described with reference to FIG. 8.

At 1120, the method may include receiving, during the full-duplex time interval, the one or more signals via the first set of frequency resources, where the one or more signals are configured to reduce a PAPR associated with the one or more data messages. The operations of 1120 may be performed in accordance with examples as disclosed herein. In some examples, aspects of the operations of 1120 may be performed by a PAPR reduction signal reception manager 835 as described with reference to FIG. 8.

Figure 12:
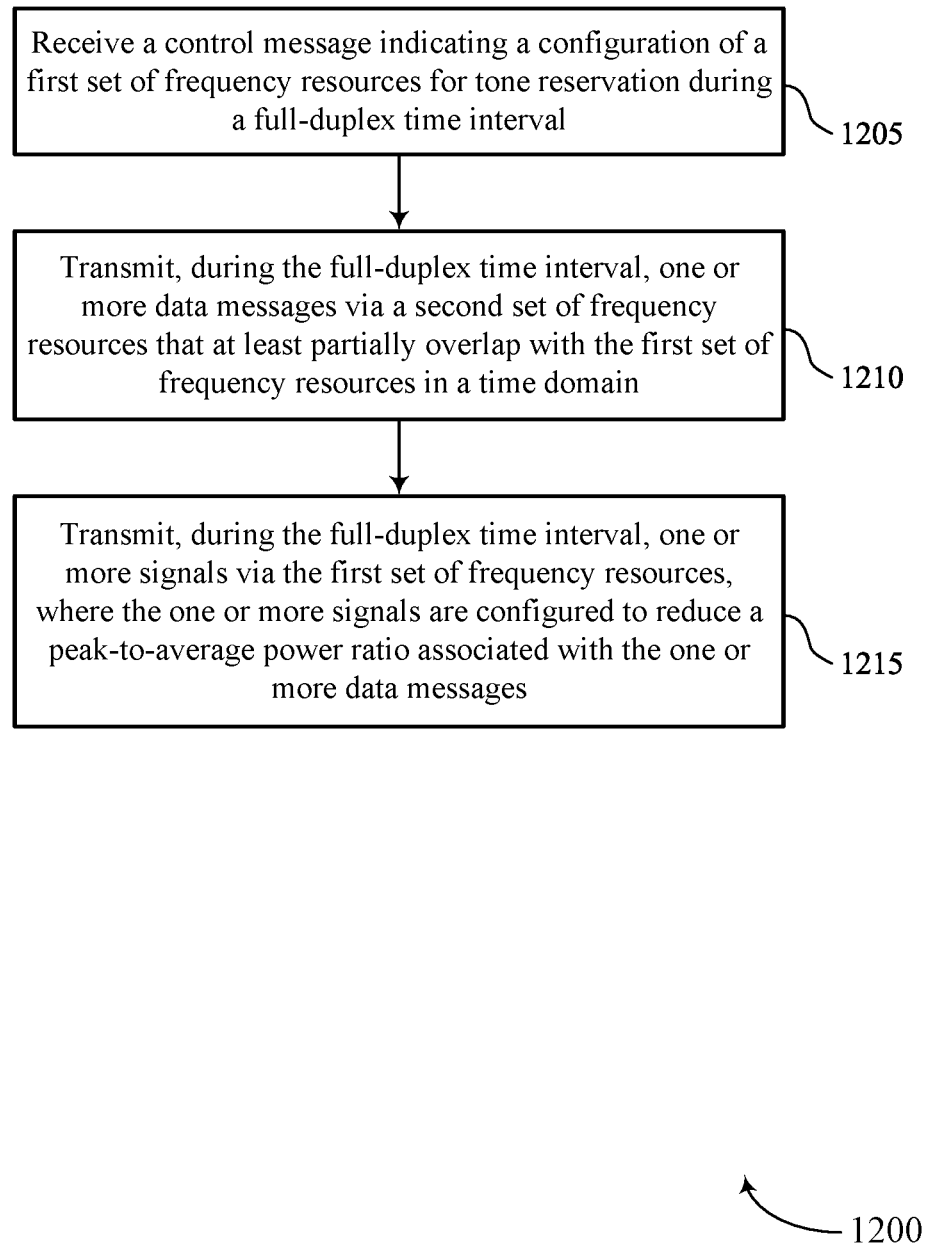

FIG. 12 shows a flowchart illustrating a method 1200 that supports TR techniques in full-duplex networks in accordance with aspects of the present disclosure. The operations of the method 1200 may be implemented by a wireless device (e.g., a UE, a network entity) or its components as described herein. For example, the operations of the method 1200 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1205, the method may include receiving a control message indicating a configuration of a first set of frequency resources for TR during a full-duplex time interval. The operations of 1205 may be performed in accordance with examples as disclosed herein. In some examples, aspects of the operations of 1205 may be performed by a TR resource configuration manager 825 as described with reference to FIG. 8.

At 1210, the method may include transmitting, during the full-duplex time interval, one or more data messages via a second set of frequency resources that at least partially overlap with the first set of frequency resources in a time domain. The operations of 1210 may be performed in accordance with examples as disclosed herein. In some examples, aspects of the operations of 1210 may be performed by a data message transmission manager 840 as described with reference to FIG. 8.

At 1215, the method may include transmitting, during the full-duplex time interval, one or more signals via the first set of frequency resources, where the one or more signals are configured to reduce a PAPR associated with the one or more data messages. The operations of 1215 may be performed in accordance with examples as disclosed herein. In some examples, aspects of the operations of 1215 may be performed by a PAPR reduction signal transmission manager 845 as described with reference to FIG. 8.

Figure 13:
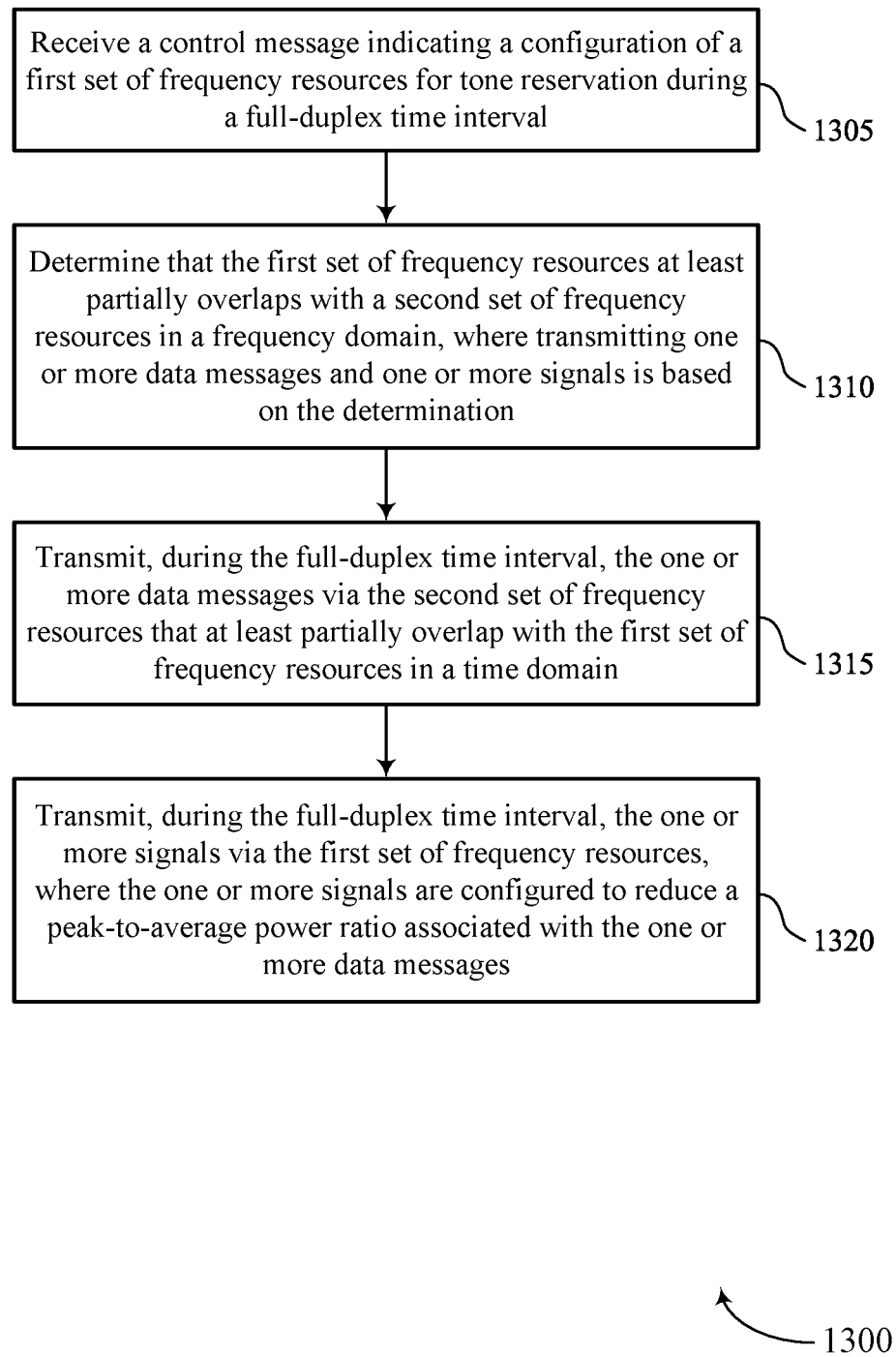

FIG. 13 shows a flowchart illustrating a method 1300 that supports TR techniques in full-duplex networks in accordance with aspects of the present disclosure. The operations of the method 1300 may be implemented by a wireless device (e.g., a UE, a network entity) or its components as described herein. For example, the operations of the method 1300 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1305, the method may include receiving a control message indicating a configuration of a first set of frequency resources for TR during a full-duplex time interval. The operations of 1305 may be performed in accordance with examples as disclosed herein. In some examples, aspects of the operations of 1305 may be performed by a TR resource configuration manager 825 as described with reference to FIG. 8.

At 1310, the method may include determining that the first set of frequency resources at least partially overlaps with a second set of frequency resources in a frequency domain, where transmitting one or more data messages and one or more signals is based on the determination. The operations of 1310 may be performed in accordance with examples as disclosed herein. In some examples, aspects of the operations of 1310 may be performed by a full/partial TR determination manager 870 as described with reference to FIG. 8.

At 1315, the method may include transmitting, during the full-duplex time interval, the one or more data messages via the second set of frequency resources that at least partially overlap with the first set of frequency resources in a time domain. The operations of 1315 may be performed in accordance with examples as disclosed herein. In some examples, aspects of the operations of 1315 may be performed by a data message transmission manager 840 as described with reference to FIG. 8.

At 1320, the method may include transmitting, during the full-duplex time interval, the one or more signals via the first set of frequency resources, where the one or more signals are configured to reduce a PAPR associated with the one or more data messages. The operations of 1320 may be performed in accordance with examples as disclosed herein. In some examples, aspects of the operations of 1320 may be performed by a PAPR reduction signal transmission manager 845 as described with reference to FIG. 8.

Figure 14:
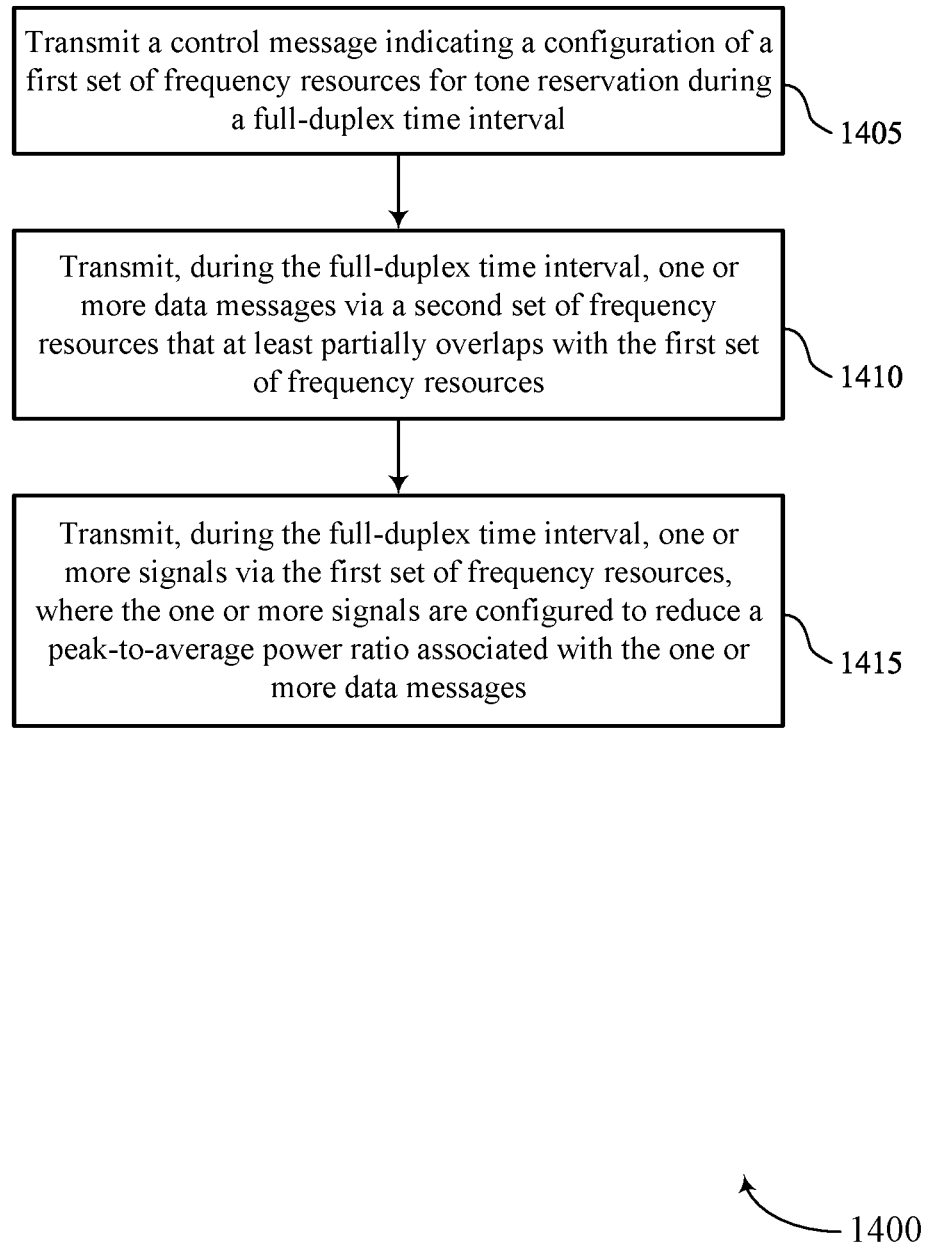

FIG. 14 shows a flowchart illustrating a method 1400 that supports TR techniques in full-duplex networks in accordance with aspects of the present disclosure. The operations of the method 1400 may be implemented by a wireless device (e.g., a UE, a network entity) or its components as described herein. For example, the operations of the method 1400 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1405, the method may include transmitting a control message indicating a configuration of a first set of frequency resources for TR during a full-duplex time interval. The operations of 1405 may be performed in accordance with examples as disclosed herein. In some examples, aspects of the operations of 1405 may be performed by a TR resource configuration component 850 as described with reference to FIG. 8.

At 1410, the method may include transmitting, during the full-duplex time interval, one or more data messages via a second set of frequency resources that at least partially overlaps with the first set of frequency resources. The operations of 1410 may be performed in accordance with examples as disclosed herein. In some examples, aspects of the operations of 1410 may be performed by a data message transmission component 855 as described with reference to FIG. 8.

At 1415, the method may include transmitting, during the full-duplex time interval, one or more signals via the first set of frequency resources, where the one or more signals are configured to reduce a PAPR associated with the one or more data messages. The operations of 1415 may be performed in accordance with examples as disclosed herein. In some examples, aspects of the operations of 1415 may be performed by a PAPR reduction signal transmission manager 845 as described with reference to FIG. 8.

Figure 15:
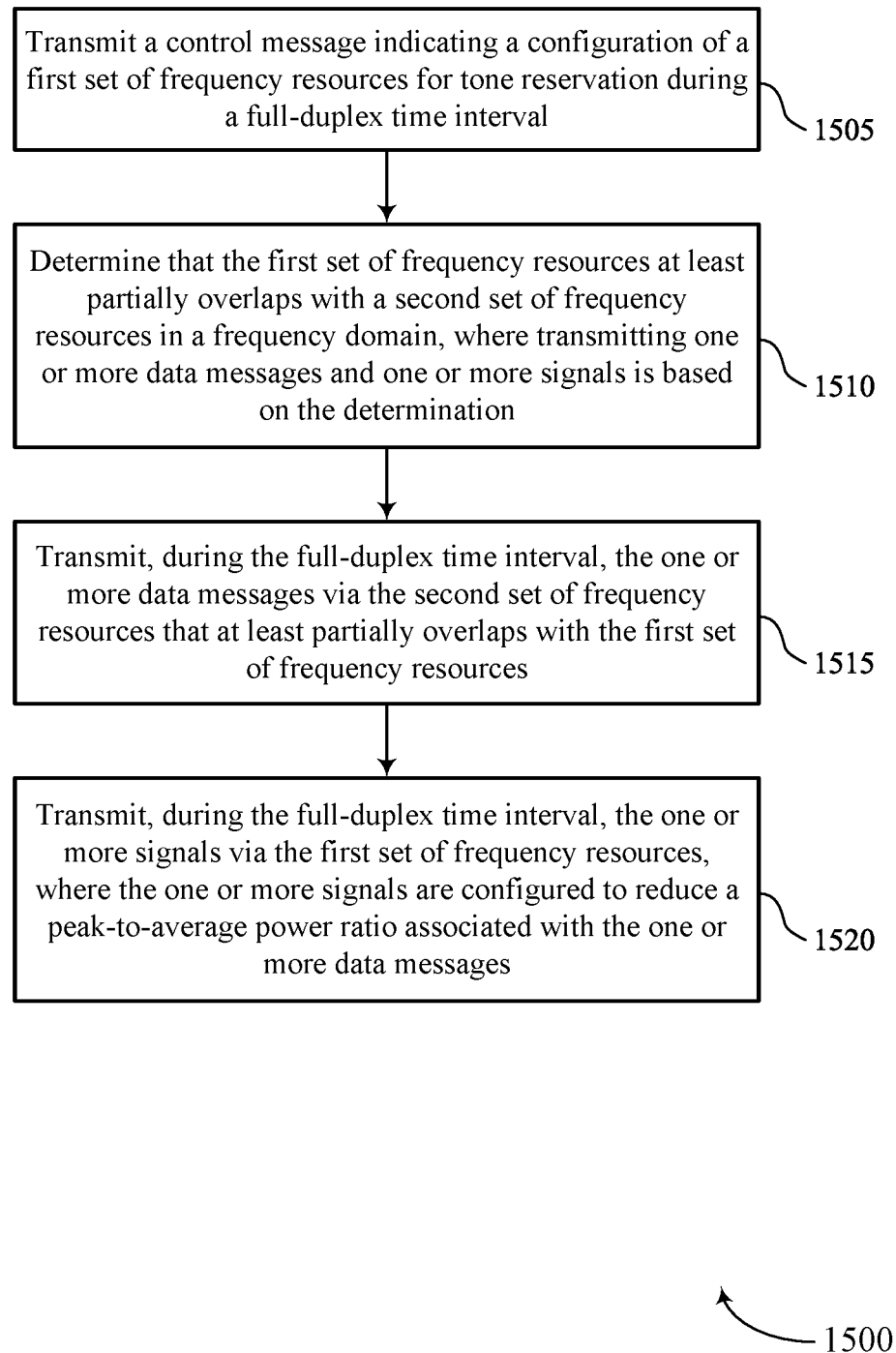

FIG. 15 shows a flowchart illustrating a method 1500 that supports TR techniques in full-duplex networks in accordance with aspects of the present disclosure. The operations of the method 1500 may be implemented by a wireless device (e.g., a UE, a network entity) or its components as described herein. For example, the operations of the method 1500 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1505, the method may include transmitting a control message indicating a configuration of a first set of frequency resources for TR during a full-duplex time interval. The operations of 1505 may be performed in accordance with examples as disclosed herein. In some examples, aspects of the operations of 1505 may be performed by a TR resource configuration component 850 as described with reference to FIG. 8.

At 1510, the method may include determining that the first set of frequency resources at least partially overlaps with a second set of frequency resources in a frequency domain, where transmitting one or more data messages and one or more signals is based on the determination. The operations of 1510 may be performed in accordance with examples as disclosed herein. In some examples, aspects of the operations of 1510 may be performed by a full/partial TR determination component 880 as described with reference to FIG. 8.

At 1515, the method may include transmitting, during the full-duplex time interval, the one or more data messages via the second set of frequency resources that at least partially overlaps with the first set of frequency resources. The operations of 1515 may be performed in accordance with examples as disclosed herein. In some examples, aspects of the operations of 1515 may be performed by a data message transmission component 855 as described with reference to FIG. 8.

At 1520, the method may include transmitting, during the full-duplex time interval, the one or more signals via the first set of frequency resources, where the one or more signals are configured to reduce a PAPR associated with the one or more data messages. The operations of 1520 may be performed in accordance with examples as disclosed herein. In some examples, aspects of the operations of 1520 may be performed by a PAPR reduction signal transmission manager 845 as described with reference to FIG. 8.

Figure 16:
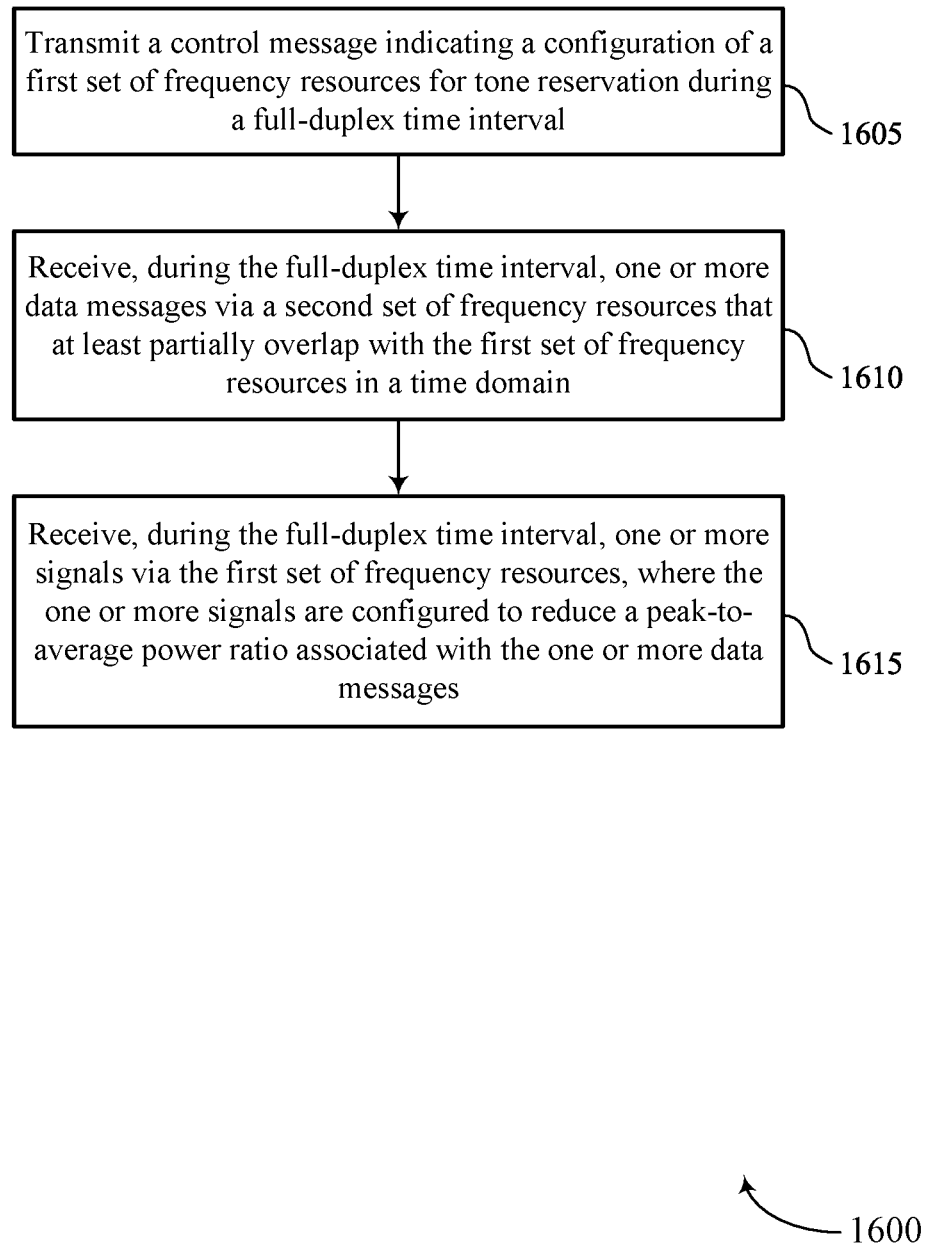

FIG. 16 shows a flowchart illustrating a method 1600 that supports TR techniques in full-duplex networks in accordance with aspects of the present disclosure. The operations of the method 1600 may be implemented by a wireless device (e.g., a UE, a network entity) or its components as described herein. For example, the operations of the method 1600 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1605, the method may include transmitting a control message indicating a configuration of a first set of frequency resources for TR during a full-duplex time interval. The operations of 1605 may be performed in accordance with examples as disclosed herein. In some examples, aspects of the operations of 1605 may be performed by a TR resource configuration component 850 as described with reference to FIG. 8.

At 1610, the method may include receiving, during the full-duplex time interval, one or more data messages via a second set of frequency resources that at least partially overlap with the first set of frequency resources in a time domain. The operations of 1610 may be performed in accordance with examples as disclosed herein. In some examples, aspects of the operations of 1610 may be performed by a data message reception component 860 as described with reference to FIG. 8.

At 1615, the method may include receiving, during the full-duplex time interval, one or more signals via the first set of frequency resources, where the one or more signals are configured to reduce a PAPR associated with the one or more data messages. The operations of 1615 may be performed in accordance with examples as disclosed herein. In some examples, aspects of the operations of 1615 may be performed by a PAPR reduction signal reception component 865 as described with reference to FIG. 8.

Figure 17:
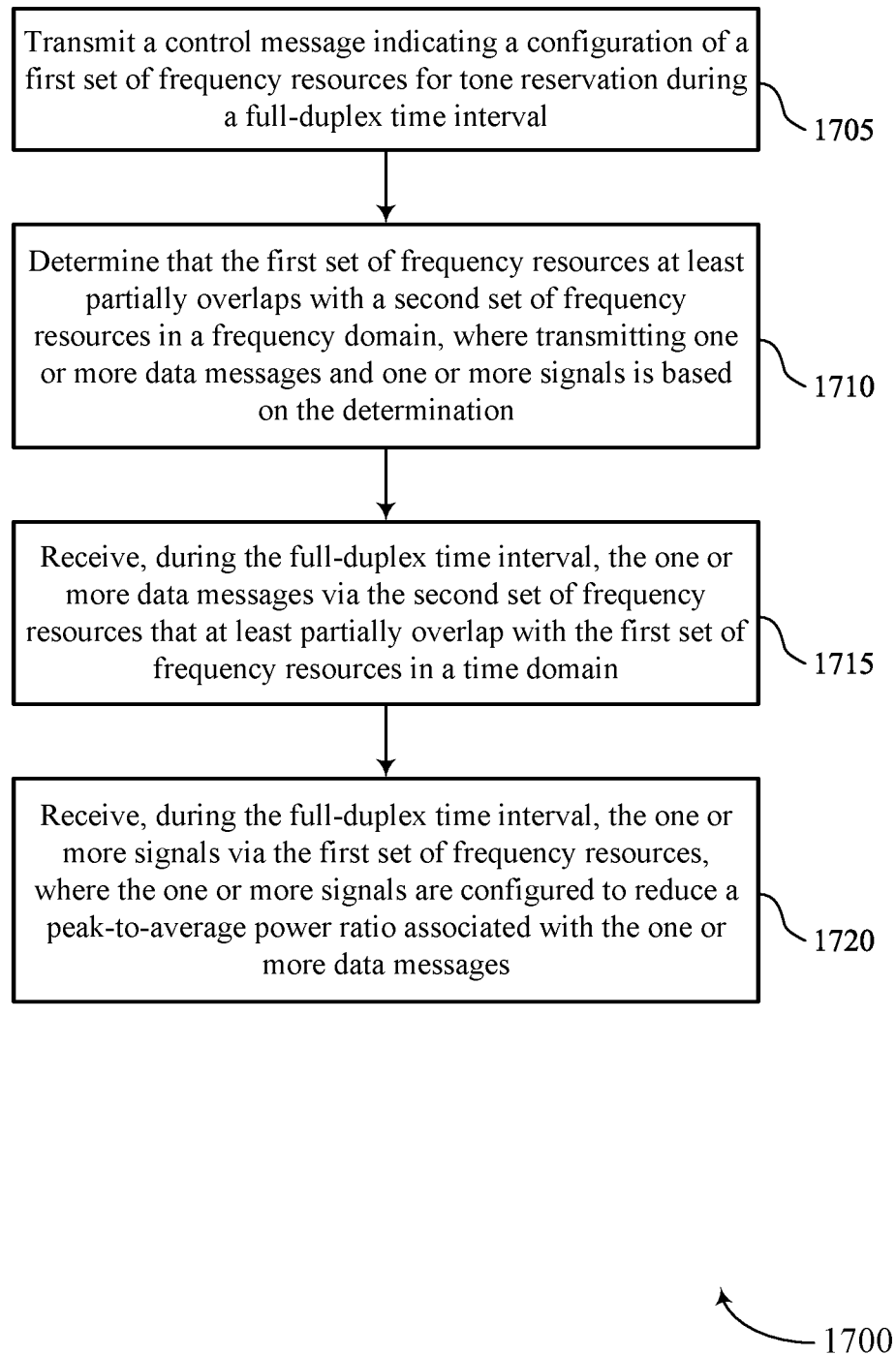

FIG. 17 shows a flowchart illustrating a method 1700 that supports TR techniques in full-duplex networks in accordance with aspects of the present disclosure. The operations of the method 1700 may be implemented by a wireless device (e.g., a UE, a network entity) or its components as described herein. For example, the operations of the method 1700 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1705, the method may include transmitting a control message indicating a configuration of a first set of frequency resources for TR during a full-duplex time interval. The operations of 1705 may be performed in accordance with examples as disclosed herein. In some examples, aspects of the operations of 1705 may be performed by a TR resource configuration component 850 as described with reference to FIG. 8.

At 1710, the method may include determining that the first set of frequency resources at least partially overlaps with a second set of frequency resources in a frequency domain, where transmitting one or more data messages and one or more signals is based on the determination (e.g., the determining that the first set of frequency resources at least partially overlaps with the second set of frequency resources in the frequency domain). The operations of 1710 may be performed in accordance with examples as disclosed herein. In some examples, aspects of the operations of 1710 may be performed by a full/partial TR determination component 880 as described with reference to FIG. 8.

At 1715, the method may include receiving, during the full-duplex time interval, the one or more data messages via the second set of frequency resources that at least partially overlap with the first set of frequency resources in a time domain. The operations of 1715 may be performed in accordance with examples as disclosed herein. In some examples, aspects of the operations of 1715 may be performed by a data message reception component 860 as described with reference to FIG. 8.

At 1720, the method may include receiving, during the full-duplex time interval, the one or more signals via the first set of frequency resources, where the one or more signals are configured to reduce a PAPR associated with the one or more data messages. The operations of 1720 may be performed in accordance with examples as disclosed herein. In some examples, aspects of the operations of 1720 may be performed by a PAPR reduction signal reception component 865 as described with reference to FIG. 8.

The following provides an overview of aspects of the present disclosure:

Aspect 1: A method for wireless communications by a wireless device, comprising: receiving a control message indicating a configuration of a first set of frequency resources for TR during a full-duplex time interval; receiving, during the full-duplex time interval, one or more data messages via a second set of frequency resources that at least partially overlaps with the first set of frequency resources; and receiving, during the full-duplex time interval, one or more signals via the first set of frequency resources, wherein the one or more signals are configured to reduce a PAPR associated with the one or more data messages.

Aspect 2: The method of aspect 1, further comprising: determining that the first set of frequency resources at least partially overlaps with the second set of frequency resources in a frequency domain, wherein receiving the one or more data messages and the one or more signals is based at least in part on the determination.

Aspect 3: The method of aspect 2, further comprising: receiving an indication that the first set of frequency resources partially overlaps with the second set of frequency resources in the frequency domain, wherein determining that the first set of frequency resources at least partially overlaps with the second set of frequency resources in the frequency domain is based at least in part on the indication.

Aspect 4: The method of aspect 2, further comprising: receiving an indication that the first set of frequency resources fully overlaps with the second set of frequency resources in the frequency domain, wherein determining that the first set of frequency resources at least partially overlaps with the second set of frequency resources in the frequency domain is based at least in part on the indication.

Aspect 5: The method of any of aspects 2 through 4, further comprising: receiving an indication of a second configuration for receiving the one or more data messages and the one or more signals via partially overlapping resources or via fully overlapping resources, or both, wherein determining that the first set of frequency resources at least partially overlaps with the second set of frequency resources in the frequency domain is based at least in part on the second configuration.

Aspect 6: The method of any of aspects 1 through 5, further comprising: identifying a quantity of RBs comprising the first set of frequency resources based at least in part on the configuration, the quantity of RB being associated with a subcarrier spacing configuration, wherein the one or more signals are received via the quantity of RBs.

Aspect 7: The method of any of aspects 1 through 6, further comprising: identifying one or more frequency bands comprising the first set of frequency resources based at least in part on the configuration, wherein the one or more signals are received via the one or more frequency bands.

Aspect 8: The method of any of aspects 1 through 7, further comprising: receiving a second control message associated with the one or more data messages, the second control message indicating that the one or more signals are to be received via the first set of frequency resources, wherein the one or more signals are received in accordance with the second control message.

Aspect 9: The method of aspect 8, further comprising: determining that the one or more signals are to be received via the first set of frequency resources based at least in part on a TR configuration associated with one or more half-duplex time intervals, wherein the one or more signals are received based at least in part on the determination.

Aspect 10: The method of any of aspects 1 through 9, wherein the first set of frequency resources comprise resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

Aspect 11: The method of any of aspects 1 through 9, wherein the first set of frequency resources comprise resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval, the first frequency bandwidth at least partially overlaps with the second frequency bandwidth.

Aspect 12: The method of any of aspects 1 through 11, wherein the one or more data messages comprise uplink data messages.

Aspect 13: The method of any of aspects 1 through 11, wherein the one or more data messages comprise downlink data messages.

Aspect 14: A method for wireless communications by a wireless device, comprising: receiving a control message indicating a configuration of a first set of frequency resources for TR during a full-duplex time interval; transmitting, during the full-duplex time interval, one or more data messages via a second set of frequency resources that at least partially overlap with the first set of frequency resources in a time domain; and transmitting, during the full-duplex time interval, one or more signals via the first set of frequency resources, wherein the one or more signals are configured to reduce a PAPR associated with the one or more data messages.

Aspect 15: The method of aspect 14, further comprising: determining that the first set of frequency resources at least partially overlaps with the second set of frequency resources in a frequency domain, wherein transmitting the one or more data messages and the one or more signals is based at least in part on the determination.

Aspect 16: The method of aspect 15, further comprising: receiving an indication that the first set of frequency resources partially overlaps with the second set of frequency resources in the frequency domain, wherein determining that the first set of frequency resources at least partially overlaps with the second set of frequency resources in the frequency domain is based at least in part on the indication.

Aspect 17: The method of aspect 15, further comprising: receiving an indication that the first set of frequency resources fully overlaps with the second set of frequency resources in the frequency domain, wherein determining that the first set of frequency resources at least partially overlaps with the second set of frequency resources in the frequency domain is based at least in part on the indication.

Aspect 18: The method of any of aspects 15 through 17, further comprising: receiving an indication of a second configuration for transmitting the one or more data messages and the one or more signals via partially overlapping resources or via fully overlapping resources, or both, wherein determining that the first set of frequency resources at least partially overlaps with the second set of frequency resources in the frequency domain is based at least in part on the second configuration.

Aspect 19: The method of any of aspects 14 through 18, further comprising: identifying a quantity of RBs comprising the first set of frequency resources based at least in part on the configuration, the quantity of RB being associated with a subcarrier spacing, wherein the one or more signals are transmitted via the quantity of RBs.

Aspect 20: The method of any of aspects 14 through 19, further comprising: identifying one or more frequency bands comprising the first set of frequency resources based at least in part on the configuration, wherein the one or more signals are transmitted via the one or more frequency bands.

Aspect 21: The method of any of aspects 14 through 20, further comprising: receiving a second control message associated with the one or more data messages, the second control message indicating that the one or more signals are to be transmitted via the first set of frequency resources, wherein the one or more signals are transmitted in accordance with the second control message.

Aspect 22: The method of aspect 21, further comprising: determining that the one or more signals are to be transmitted via the first set of frequency resources based at least in part on a TR configuration associated with one or more half-duplex time intervals, wherein the one or more signals are transmitted based at least in part on the determination.

Aspect 23: The method of any of aspects 14 through 22, wherein the first set of frequency resources comprise resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

Aspect 24: The method of any of aspects 14 through 22, wherein the first set of frequency resources comprise resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval, the first frequency bandwidth at least partially overlaps with the second frequency bandwidth.

Aspect 25: The method of any of aspects 14 through 24, wherein the one or more data messages comprise uplink data messages.

Aspect 26: The method of any of aspects 14 through 24, wherein the one or more data messages comprise downlink data messages.

Aspect 27: A method for wireless communications by a wireless device, comprising: transmitting a control message indicating a configuration of a first set of frequency resources for TR during a full-duplex time interval; transmitting, during the full-duplex time interval, one or more data messages via a second set of frequency resources that at least partially overlaps with the first set of frequency resources; and transmitting, during the full-duplex time interval, one or more signals via the first set of frequency resources, wherein the one or more signals are configured to reduce a PAPR associated with the one or more data messages.

Aspect 28: The method of aspect 27, further comprising: determining that the first set of frequency resources at least partially overlaps with the second set of frequency resources in a frequency domain, wherein transmitting the one or more data messages and the one or more signals is based at least in part on the determination.

Aspect 29: The method of aspect 28, further comprising: transmitting an indication that the first set of frequency resources partially overlaps with the second set of frequency resources in the frequency domain based at least in part on the determination.

Aspect 30: The method of aspect 28, further comprising: transmitting an indication that the first set of frequency resources fully overlaps with the second set of frequency resources in the frequency domain based at least in part on the determination.

Aspect 31: The method of any of aspects 28 through 30, further comprising: transmitting an indication of a second configuration for receiving the one or more data messages and the one or more signals via partially overlapping resources or via fully overlapping resources, or both, based at least in part on the determination.

Aspect 32: The method of any of aspects 27 through 31, further comprising: transmitting a second control message associated with the one or more data messages, the second control message indicating that the one or more signals are to be received via the first set of frequency resources, wherein the one or more signals are transmitted in accordance with the second control message.

Aspect 33: The method of any of aspects 27 through 32, further comprising: transmitting an indication of a TR configuration associated with one or more half-duplex time intervals, wherein the one or more signals are transmitted based at least in part on the TR configuration associated with the one or more half-duplex time intervals.

Aspect 34: The method of any of aspects 27 through 33, wherein the first set of frequency resources is defined by a quantity of RBs associated with a subcarrier spacing configuration, or one or more frequency bands, or any combination thereof.

Aspect 35: A method for wireless communications by a wireless device, comprising: transmitting a control message indicating a configuration of a first set of frequency resources for TR during a full-duplex time interval; receiving, during the full-duplex time interval, one or more data messages via a second set of frequency resources that at least partially overlap with the first set of frequency resources in a time domain; and receiving, during the full-duplex time interval, one or more signals via the first set of frequency resources, wherein the one or more signals are configured to reduce a PAPR associated with the one or more data messages.

Aspect 36: The method of aspect 35, further comprising: determining that the first set of frequency resources at least partially overlaps with the second set of frequency resources in a frequency domain, wherein transmitting the one or more data messages and the one or more signals is based at least in part on the determination.

Aspect 37: The method of aspect 36, further comprising: transmitting an indication that the first set of frequency resources partially overlaps with the second set of frequency resources in the frequency domain based at least in part on the determination.

Aspect 38: The method of aspect 36, further comprising: transmitting an indication that the first set of frequency resources fully overlaps with the second set of frequency resources in the frequency domain based at least in part on the determination.

Aspect 39: The method of any of aspects 36 through 38, further comprising: transmitting an indication of a second configuration for transmitting the one or more data messages and the one or more signals via partially overlapping resources or via fully overlapping resources, or both, based at least in part on the determination.

Aspect 40: The method of any of aspects 35 through 39, further comprising: transmitting a second control message associated with the one or more data messages, the second control message indicating that the one or more signals are to be transmitted via the first set of frequency resources, wherein the one or more signals are received in accordance with the second control message.

Aspect 41: The method of any of aspects 35 through 40, further comprising: transmitting an indication of a TR configuration associated with one or more half-duplex time intervals, wherein the one or more signals are received based at least in part on the TR configuration associated with the one or more half-duplex time intervals.

Aspect 42: The method of any of aspects 35 through 41, wherein the first set of frequency resources is defined by a quantity of RBs associated with a subcarrier spacing configuration, or one or more frequency bands, or any combination thereof.

Aspect 43: A wireless device for wireless communications, comprising one or more memories storing processor-executable code, and one or more processors coupled with the one or more memories and individually or collectively operable to execute the code to perform a method of any of aspects 1 through 13.

Aspect 44: A wireless device for wireless communications, comprising at least one means for performing a method of any of aspects 1 through 13.

Aspect 45: A non-transitory computer-readable medium storing code for wireless communications, the code comprising instructions executable by a processor to perform a method of any of aspects 1 through 13.

Aspect 46: A wireless device for wireless communications, comprising one or more memories storing processor-executable code, and one or more processors coupled with the one or more memories and individually or collectively operable to execute the code to perform a method of any of aspects 14 through 26.

Aspect 47: A wireless device for wireless communications, comprising at least one means for performing a method of any of aspects 14 through 26.

Aspect 48: A non-transitory computer-readable medium storing code for wireless communications, the code comprising instructions executable by a processor to perform a method of any of aspects 14 through 26.

Aspect 49: A wireless device for wireless communications, comprising one or more memories storing processor-executable code, and one or more processors coupled with the one or more memories and individually or collectively operable to execute the code to perform a method of any of aspects 27 through 34.

Aspect 50: A wireless device for wireless communications, comprising at least one means for performing a method of any of aspects 27 through 34.

Aspect 51: A non-transitory computer-readable medium storing code for wireless communications, the code comprising instructions executable by a processor to perform a method of any of aspects 27 through 34.

Aspect 52: A wireless device for wireless communications, comprising one or more memories storing processor-executable code, and one or more processors coupled with the one or more memories and individually or collectively operable to execute the code to perform a method of any of aspects 35 through 42.

Aspect 53: A wireless device for wireless communications, comprising at least one means for performing a method of any of aspects 35 through 42.

Aspect 54: A non-transitory computer-readable medium storing code for wireless communications, the code comprising instructions executable by a processor to perform a method of any of aspects 35 through 42.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A wireless device, comprising:
   one or more memories storing processor-executable code;
   a transceiver; and
   one or more processors coupled with the one or more memories and the transceiver and individually or collectively operable to execute the code to:
      receive, via the transceiver, a control message indicating a configuration of a first set of frequency resources for tone reservation during a full-duplex time interval;
      receive, via the transceiver and during the full-duplex time interval, one or more data messages via a second set of frequency resources that at least partially overlaps with the first set of frequency resources; and
      receive, via the transceiver and during the full-duplex time interval, one or more signals via the first set of frequency resources, wherein the one or more signals are configured to reduce a peak-to-average power ratio associated with the one or more data messages.

2. The wireless device of claim 1, wherein the one or more processors are individually or collectively further operable to execute the code to:
   determine that the first set of frequency resources at least partially overlaps with the second set of frequency resources in a frequency domain, wherein receiving the one or more data messages and the one or more signals is based at least in part on the determination.

3. The wireless device of claim 2, wherein the one or more processors are individually or collectively further operable to execute the code to:
   receive, via the transceiver, an indication that the first set of frequency resources partially overlaps with the second set of frequency resources in the frequency domain, wherein determining that the first set of frequency resources at least partially overlaps with the second set of frequency resources in the frequency domain is based at least in part on the indication.

4. The wireless device of claim 2, wherein the one or more processors are individually or collectively further operable to execute the code to:
   receive, via the transceiver, an indication that the first set of frequency resources fully overlaps with the second set of frequency resources in the frequency domain, wherein determining that the first set of frequency resources at least partially overlaps with the second set of frequency resources in the frequency domain is based at least in part on the indication.

5. The wireless device of claim 2, wherein the one or more processors are individually or collectively further operable to execute the code to:
   receive, via the transceiver, an indication of a second configuration for receiving the one or more data messages and the one or more signals via partially overlapping resources or via fully overlapping resources, or both, wherein determining that the first set of frequency resources at least partially overlaps with the second set of frequency resources in the frequency domain is based at least in part on the second configuration.

6. The wireless device of claim 1, wherein the one or more processors are individually or collectively further operable to execute the code to:
   identify a quantity of resource blocks comprising the first set of frequency resources based at least in part on the configuration, the quantity of resource blocks being associated with a subcarrier spacing configuration, wherein the one or more signals are received via the quantity of resource blocks.

7. The wireless device of claim 1, wherein the one or more processors are individually or collectively further operable to execute the code to:
   identify one or more frequency bands comprising the first set of frequency resources based at least in part on the configuration, wherein the one or more signals are received via the one or more frequency bands.

8. The wireless device of claim 1, wherein the one or more processors are individually or collectively further operable to execute the code to:
   receive, via the transceiver, a second control message associated with the one or more data messages, the second control message indicating that the one or more signals are to be received via the first set of frequency resources, wherein the one or more signals are received in accordance with the second control message.

9. The wireless device of claim 8, wherein the one or more processors are individually or collectively further operable to execute the code to:
   determine that the one or more signals are to be received via the first set of frequency resources based at least in part on a tone reservation configuration associated with one or more half-duplex time intervals, wherein the one or more signals are received based at least in part on the determination.

10. The wireless device of claim 1, wherein the first set of frequency resources comprise resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

11. The wireless device of claim 1, wherein the first set of frequency resources comprise resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval, and wherein the first frequency bandwidth at least partially overlaps with the second frequency bandwidth.

12. The wireless device of claim 1, wherein the one or more data messages comprise uplink data messages.

13. The wireless device of claim 1, wherein the one or more data messages comprise downlink data messages.

14. A wireless device, comprising:
one or more memories storing processor-executable code;
a transceiver; and
one or more processors coupled with the one or more memories and individually or collectively operable to execute the code to:
receive, via the transceiver, a control message indicating a configuration of a first set of frequency resources for tone reservation during a full-duplex time interval;
transmit, via the transceiver and during the full-duplex time interval, one or more data messages via a second set of frequency resources that at least partially overlap with the first set of frequency resources in a time domain; and
transmit, via the transceiver and during the full-duplex time interval, one or more signals via the first set of frequency resources, wherein the one or more signals are configured to reduce a peak-to-average power ratio associated with the one or more data messages.

15. The wireless device of claim 14, wherein the one or more processors are individually or collectively further operable to execute the code to:
determine that the first set of frequency resources at least partially overlaps with the second set of frequency resources in a frequency domain, wherein transmitting the one or more data messages and the one or more signals is based at least in part on the determination.

16. The wireless device of claim 15, wherein the one or more processors are individually or collectively further operable to execute the code to:
receive, via the transceiver, an indication that the first set of frequency resources partially overlaps with the second set of frequency resources in the frequency domain, wherein determining that the first set of frequency resources at least partially overlaps with the second set of frequency resources in the frequency domain is based at least in part on the indication.

17. The wireless device of claim 15, wherein the one or more processors are individually or collectively further operable to execute the code to:
receive, via the transceiver, an indication that the first set of frequency resources fully overlaps with the second set of frequency resources in the frequency domain, wherein determining that the first set of frequency resources at least partially overlaps with the second set of frequency resources in the frequency domain is based at least in part on the indication.

18. The wireless device of claim 15, wherein the one or more processors are individually or collectively further operable to execute the code to:
receive, via the transceiver, an indication of a second configuration for transmitting the one or more data messages and the one or more signals via partially overlapping resources or via fully overlapping resources, or both, wherein determining that the first set of frequency resources at least partially overlaps with the second set of frequency resources in the frequency domain is based at least in part on the second configuration.

19. The wireless device of claim 14, wherein the one or more processors are individually or collectively further operable to execute the code to:
identify a quantity of resource blocks comprising the first set of frequency resources based at least in part on the configuration, the quantity of resource blocks being associated with a subcarrier spacing, wherein the one or more signals are transmitted via the quantity of resource blocks.

20. The wireless device of claim 14, wherein the one or more processors are individually or collectively further operable to execute the code to:
identify one or more frequency bands comprising the first set of frequency resources based at least in part on the configuration, wherein the one or more signals are transmitted via the one or more frequency bands.

21. The wireless device of claim 14, wherein the one or more processors are individually or collectively further operable to execute the code to:
receive, via the transceiver, a second control message associated with the one or more data messages, the second control message indicating that the one or more signals are to be transmitted via the first set of frequency resources, wherein the one or more signals are transmitted in accordance with the second control message.

22. The wireless device of claim 21, wherein the one or more processors are individually or collectively further operable to execute the code to:
determine that the one or more signals are to be transmitted via the first set of frequency resources based at least in part on a tone reservation configuration associated with one or more half-duplex time intervals, wherein the one or more signals are transmitted based at least in part on the determination.

23. The wireless device of claim 14, wherein the first set of frequency resources comprise resources within a frequency range corresponding to a boundary between a first frequency subband and a second frequency subband, the first frequency subband associated with receiving the one or more data messages during the full-duplex time interval and the second frequency subband associated with transmitting one or more other data messages during the full-duplex time interval.

24. The wireless device of claim 14, wherein the first set of frequency resources comprise resources within a region overlapping with a first frequency bandwidth and a second frequency bandwidth, the first frequency bandwidth associated with receiving the one or more data messages during the full-duplex time interval and the second frequency bandwidth associated with transmitting one or more other data messages during the full-duplex time interval, and wherein the first frequency bandwidth at least partially overlaps with the second frequency bandwidth.

25. The wireless device of claim 14, wherein the one or more data messages comprise uplink data messages.

26. The wireless device of claim 14, wherein the one or more data messages comprise downlink data messages.

27. A wireless device, comprising:
one or more memories storing processor-executable code; and
one or more processors coupled with the one or more memories and individually or collectively operable to execute the code to:
transmit a control message indicating a configuration of a first set of frequency resources for tone reservation during a full-duplex time interval;
transmit, during the full-duplex time interval, one or more data messages via a second set of frequency resources that at least partially overlaps with the first set of frequency resources; and
transmit, during the full-duplex time interval, one or more signals via the first set of frequency resources, wherein the one or more signals are configured to reduce a peak-to-average power ratio associated with the one or more data messages.

28. The wireless device of claim 27, wherein the one or more processors are individually or collectively further operable to execute the code to:
determine that the first set of frequency resources at least partially overlaps with the second set of frequency resources in a frequency domain, wherein transmitting the one or more data messages and the one or more signals is based at least in part on the determination.

29. A wireless device, comprising:
one or more memories storing processor-executable code; and
one or more processors coupled with the one or more memories and individually or collectively operable to execute the code to:
transmit a control message indicating a configuration of a first set of frequency resources for tone reservation during a full-duplex time interval;
receive, during the full-duplex time interval, one or more data messages via a second set of frequency resources that at least partially overlap with the first set of frequency resources in a time domain; and
receive, during the full-duplex time interval, one or more signals via the first set of frequency resources, wherein the one or more signals are configured to reduce a peak-to-average power ratio associated with the one or more data messages.

30. The wireless device of claim 29, wherein the one or more processors are individually or collectively further operable to execute the code to:
determine that the first set of frequency resources at least partially overlaps with the second set of frequency resources in a frequency domain, wherein transmitting the one or more data messages and the one or more signals is based at least in part on the determination.

\* \* \* \* \*